(12) United States Patent
Zhao et al.

(10) Patent No.: US 12,641,626 B2
(45) Date of Patent: May 26, 2026

(54) SIDELINK DATA TRANSMISSION METHOD AND APPARATUS, AND TERMINAL

(71) Applicant: CICT CONNECTED AND INTELLIGENT TECHNOLOGIES CO., LTD., Chongqing (CN)

(72) Inventors: Rui Zhao, Chongqing (CN); Shilei Zheng, Chongqing (CN); Chenxin Li, Chongqing (CN)

(73) Assignee: CICT CONNECTED AND INTELLIGENT TECHNOLOGIES CO., LTD., Chongqing (CN)

( * ) Notice: Subject to any disclaimer, the term of this patent is extended or adjusted under 35 U.S.C. 154(b) by 0 days.

(21) Appl. No.: 18/430,374

(22) Filed: Feb. 1, 2024

(65) Prior Publication Data

US 2024/0205941 A1 Jun. 20, 2024

Related U.S. Application Data

(63) Continuation of application No. PCT/CN2022/108613, filed on Jul. 28, 2022.

(30) Foreign Application Priority Data

Aug. 6, 2021 (CN) .......................... 202110904191.4

(51) Int. Cl.
*H04W 72/25* (2023.01)
*H04W 72/0446* (2023.01)
(Continued)

(52) U.S. Cl.
CPC ....... *H04W 72/25* (2023.01); *H04W 72/0446* (2013.01); *H04W 72/0453* (2013.01); *H04W 72/40* (2023.01)

(58) Field of Classification Search
CPC ............. H04W 72/25; H04W 72/0446; H04W 72/0453; H04W 72/40; H04W 72/02;
(Continued)

(56) References Cited

U.S. PATENT DOCUMENTS

| | | | |
|---|---|---|---|
| 2020/0374859 A1 | 11/2020 | Han et al. | |
| 2022/0361185 A1* | 11/2022 | Sarkis | ................... H04L 5/0055 |

(Continued)

FOREIGN PATENT DOCUMENTS

| | | |
|---|---|---|
| CN | 106792885 A | 5/2017 |
| CN | 110972290 A | 4/2020 |

(Continued)

OTHER PUBLICATIONS

S.-Y. Lien et al., "3GPP NR Sidelink Transmissions Toward 5G V2X," in IEEE Access, vol. 8, pp. 35368-35382, 2020, doi: 10.1109/ACCESS.2020.2973706 (Year: 2020).*
"Code-Division Multiple Access" Wikipedia, The Free Encyclopedia. [Online]. Available: https://en.wikipedia.org/wiki/Code-division_multiple_access. Accessed: Mar. 19, 2025 (Year: 2025).*
Ali Z, Lagén S, Giupponi L, Rouil R. 3GPP NR V2X Mode 2: Overview, Models and System-Level Evaluation. IEEE Access. Jun. 2021;9:10.1109/access.2021.3090855. doi: 10.1109/access.2021.
(Continued)

*Primary Examiner* — Jae Y Lee
*Assistant Examiner* — Haeshil Jessica Choi
(74) *Attorney, Agent, or Firm* — Westbridge IP LLC

(57) ABSTRACT

Disclosed are a sidelink data transmission method, a sidelink data transmission apparatus, and a terminal. The method includes: determining a time-frequency resource location of each of a first transmission resource and a second transmission resource for data transmission; transmitting data on the first transmission resource, where the data that is transmitted includes at least SCI used to indicate the time-frequency resource location of the second transmission resource; and the second transmission resource is transmitted after the first transmission resource; and determining a target transmission resource of a resource conflict indication channel used to receive resource conflict indication information, where the resource conflict indication information is used to indicate (Continued)

that a resource conflict occurs on the second transmission resource, there is at least a minimum interval time between the first transmission resource and the second transmission resource. The minimum interval time includes a first interval time and a second interval time.

16 Claims, 7 Drawing Sheets

(51) Int. Cl.
*H04W 72/0453* (2023.01)
*H04W 72/40* (2023.01)
(58) Field of Classification Search
CPC ..... H04W 92/18; H04W 24/08; H04W 72/53; H04L 5/0094; H04L 5/0058
USPC .......................................................... 370/329
See application file for complete search history.

(56) References Cited

U.S. PATENT DOCUMENTS

| | | | | |
|---|---|---|---|---|
| 2023/0037493 A1* | 2/2023 | Wu | ........................ | H04W 72/20 |
| 2023/0362917 A1* | 11/2023 | Zhang | ................. | H04W 72/563 |
| 2024/0057121 A1* | 2/2024 | Ganesan | ............... | H04L 1/1819 |
| 2024/0381377 A1* | 11/2024 | Ren | ................... | H04W 72/0446 |

FOREIGN PATENT DOCUMENTS

| | | |
|---|---|---|
| CN | 112584438 A | 3/2021 |
| CN | 112640499 A | 4/2021 |
| EP | 4256870 A1 | 10/2023 |
| EP | 4280767 A1 | 11/2023 |
| JP | 2024527139 A | 7/2024 |
| WO | 2022118301 A1 | 6/2022 |
| WO | 2023010399 A1 | 2/2023 |

OTHER PUBLICATIONS

3090855. PMID: 37461405; PMCID: PMC10350958 (Year: 2021).*
Harounabadi, Mehdi et al., "V2X in 3GPP Standardization: NR Sidelink in Release-16 and Beyond" in IEEE Communications Standards Magazine IEEE Access, vol. 5, 2021, doi: 10.1109/mcomstd.001.2000070 (Year: 2021).*
Extended European Search Report issued in counterpart European Patent Application No. 22852024.3, dated Sep. 18, 2024.
Intel Corporation, Discussion and Decision on Inter-UE Coordination Schemes for Sidelink Communication, R1-2104927, 3GPP TSG RAN WG1 #105-e, dated May 12, 2021.
International Search Report and Written Opinion issued in corresponding PCT Application No. PCT/CN2022/108613, dated Oct. 21, 2022.
Notice of Reasons for Refusal issued in counterpart Japanese Patent Application No. JP 2024-506275, dated Jan. 7, 2025.
Qualcomm Incorporated, Discussion/Decision on Reliability and Latency Enhancements for Mode 2, R1- 2105982, 3GPP TSG RAN WG1 Meeting #105-e, dated May 25, 2021.
Apple, On Inter-UE Coordination, R1-2105127, 3GPP TSG RAN WG1 #105-e, dated May 12, 2021.
Huawei et al., Inter-UE coordination in sidelink resource allocation, R1-2104237, 3GPP TSG RAN WG1 Meeting #105-e, dated May 12, 2021.
Moderator (LG Electronics), Feature lead summary for AI 8.11.1.2 Inter-UE coordination for Mode 2 enhancements, R1-2106062, 3GPP TSG RAN WG1 Meeting #105-e, dated May 24, 2021.
NTT Docomo, Inc., Resource allocation for reliability and latency enhancements, R1-2105719, 3GPP TSG RAN WG1 #105-e, dated May 12, 2021.
Request for the Submission of an Opinion issued in counterpart Korean Patent Application No. KR 10-2024-7003465, dated Feb. 23, 2026.

* cited by examiner

Start

Determining a time-frequency resource location of each of a first transmission resource and a second transmission resource for data transmission    51

Transmitting data on the first transmission resource, where the data that is transmitted includes at least sidelink control information SCI used to indicate the time-frequency resource location of the second transmission resource; and the second transmission resource is transmitted after the first transmission resource    52

Determining a target transmission resource of a resource conflict indication channel used to receive resource conflict indication information, where the resource conflict indication information is used to indicate that a resource conflict occurs on the second transmission resource    53

End

FIG. 5

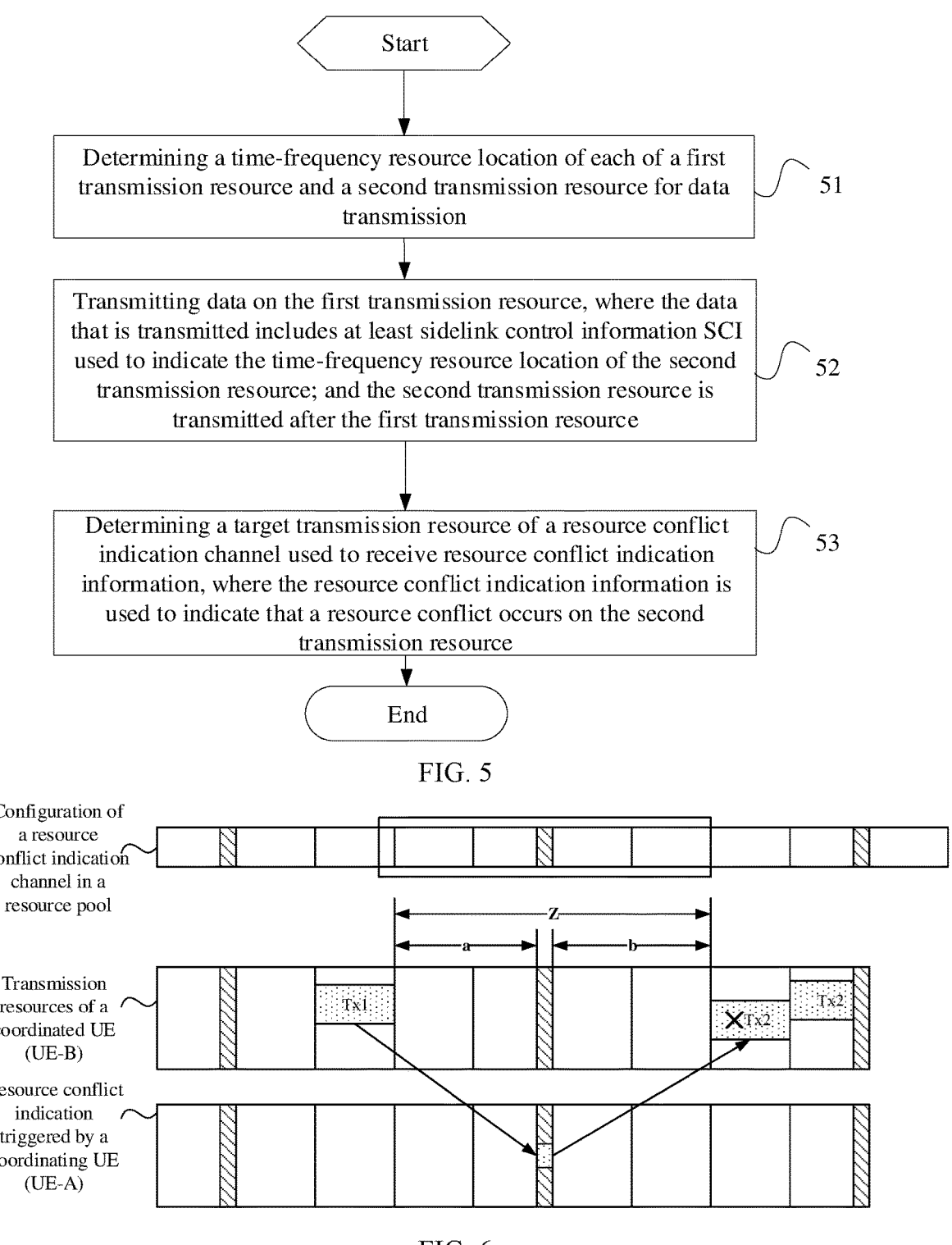

Configuration of a resource conflict indication channel in a resource pool

Transmission resources of a coordinated UE (UE-B)

Resource conflict indication triggered by a coordinating UE (UE-A)

FIG. 6

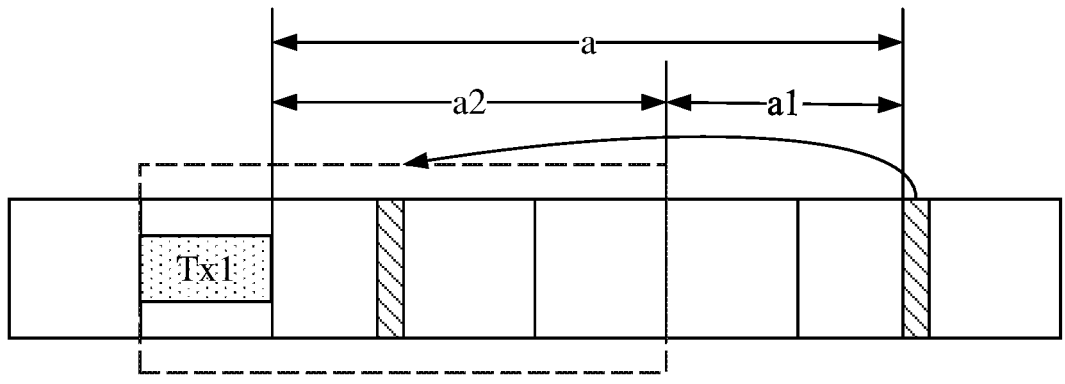
FIG. 11
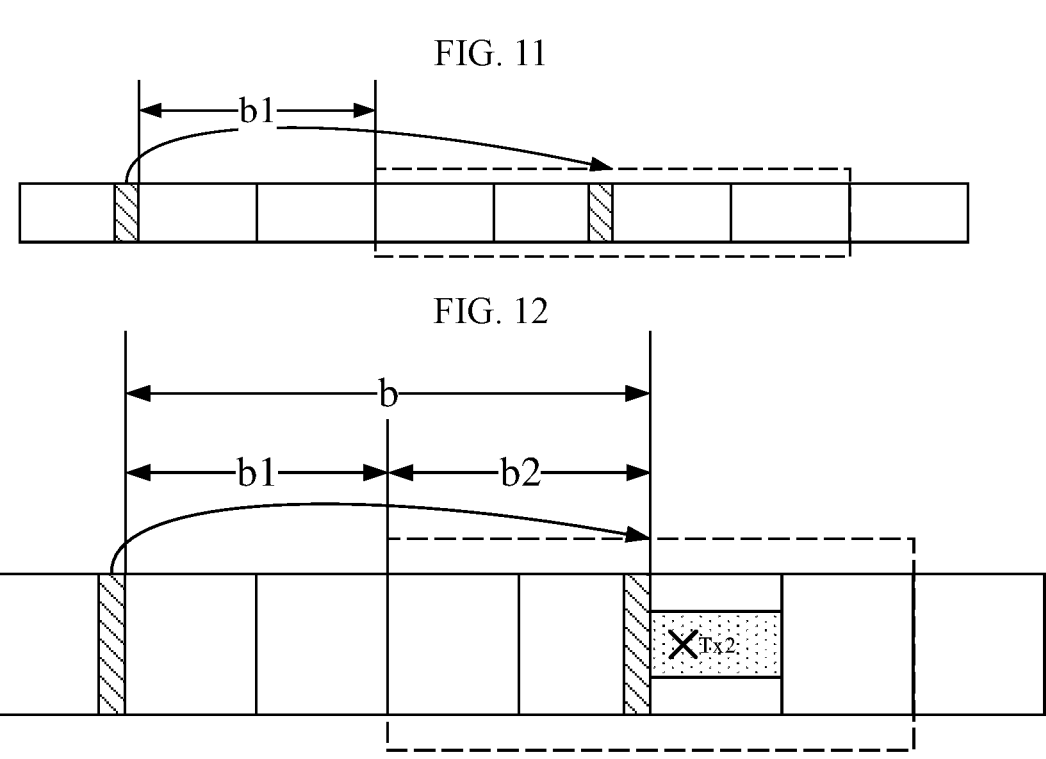
FIG. 12
FIG. 13

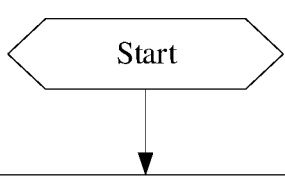

Start

Receiving data transmitted by a first terminal on a first transmission resource, where the data that is transmitted includes at least SCI used to indicate a time-frequency resource location of a second transmission resource; and the second transmission resource is transmitted after the first transmission resource          1401

Determining, based on the SCI, a target transmission resource of a resource conflict indication channel used to transmit resource conflict indication information, where the resource conflict indication information is used to indicate that a resource conflict occurs on the second transmission resource          1402

End

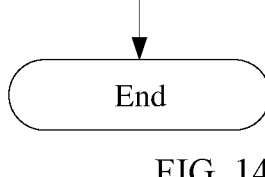

First determining module          1501

First transmitting module          1502

First receiving module          1503

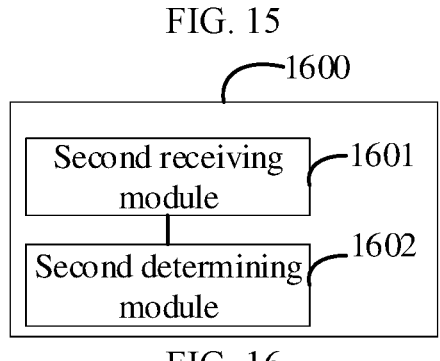

Second receiving module          1601

Second determining module          1602

FIG. 16

SIDELINK DATA TRANSMISSION METHOD AND APPARATUS, AND TERMINAL

CROSS-REFERENCE TO RELATED APPLICATIONS

This application is a continuation of International Application No. PCT/CN2022/108613, filed on Jul. 28, 2022, which claims priority to Chinese Patent Application No. 202110904191.4, filed on Aug. 6, 2021. The disclosures of the aforementioned applications are hereby incorporated by reference in their entireties.

TECHNICAL FIELD

The present disclosure relates to the field of communications technologies, and in particular, to a sidelink data transmission method, a sidelink data transmission apparatus, and a terminal.

BACKGROUND

In sidelink communication, especially in a case in which a terminal performs resource selection only based on a resource sensing result of the terminal, a sensing result on a side of a transmitting terminal cannot reflect a channel environment on a side of a receiving terminal, and thus is prone to be affected by a hidden node, an exposed node, half-duplex, and the like. Therefore, a resource selected by the transmitting terminal is inappropriate for the receiving terminal, or a resource conflict exists between the resource selected by the transmitting terminal and a resource selected by another terminal. To solve these problems, a mechanism of coordination between terminals may be introduced into sidelink.

A mechanism of resource coordination between terminals includes the following two solutions.

Solution 1: A coordinating terminal feeds back a resource set to the coordinated terminal, and the coordinated terminal determines a resource used for transmission based on the resource set fed back by the coordinating terminal.

Solution 2: As shown in FIG. 1, a coordinating terminal determines, based on resource conflict indication information received from a coordinated terminal, whether a resource conflict exists between a resource occupied by the coordinated terminal or a resource occupied in the future and the coordinated terminal itself or another terminal. If there is a resource conflict, the coordinating terminal indicates, to the coordinated terminal, a resource on a conflict occurs, and the coordinated terminal triggers resource reselection after receiving the resource conflict indication information.

In the foregoing solution 2 of resource coordination between terminals, if no new design is made for a resource selection mechanism of the coordinated terminal, a case in which a resource conflict cannot be effectively indicated in some scenarios may occur, thereby affecting data transmission reliability.

SUMMARY

The present disclosure provides a sidelink data transmission method, a sidelink data transmission apparatus, and a terminal. This solves a problem that it is difficult to effectively indicate a resource conflict in some scenarios in a related technology, so that a resource on which a conflict occurs can be effectively indicated, thereby improving data transmission reliability.

To solve the foregoing technical problem, the present disclosure is implemented as follows.

According to a first aspect, an embodiment of the present disclosure provides a sidelink data transmission method, applied to a first terminal, including:

determining a time-frequency resource location of each of a first transmission resource and a second transmission resource for data transmission;

transmitting data on the first transmission resource, where the data that is transmitted includes at least sidelink control information (SCI) used to indicate the time-frequency resource location of the second transmission resource; and the second transmission resource is transmitted after the first transmission resource; and determining a target transmission resource of a resource conflict indication channel used to receive resource conflict indication information, where the resource conflict indication information is used to indicate that a resource conflict occurs on the second transmission resource;

there is at least a minimum interval time between the first transmission resource and the second transmission resource, and the minimum interval time includes a first interval time and a second interval time;

there is at least a first interval time between the first transmission resource and the target transmission resource, and there is at least a second interval time between the target transmission resource and the second transmission resource.

According to a second aspect, an embodiment of the present disclosure provides a sidelink data transmission method, applied to a second terminal, including:

receiving data transmitted by a first terminal on a first transmission resource, where the data that is transmitted includes at least SCI used to indicate a time-frequency resource location of a second transmission resource; and the second transmission resource is transmitted after the first transmission resource; and determining, based on the SCI, a target transmission resource of a resource conflict indication channel used to transmit resource conflict indication information, where the resource conflict indication information is used to indicate that a resource conflict occurs on the second transmission resource;

there is at least a first interval time between the first transmission resource and the target transmission resource, and there is at least a second interval time between the target transmission resource and the second transmission resource.

According to a third aspect, an embodiment of the present disclosure provides a terminal, including a transceiver, a memory, a processor, and a computer program stored in the memory and running on the processor. When the processor executes the computer program, steps of the sidelink data transmission method according to the first aspect are implemented, or steps of the sidelink data transmission method according to the second aspect are implemented.

According to a fourth aspect, an embodiment of the present disclosure provides a sidelink data transmission apparatus, applied to a first terminal, including:

a first determining module, configured to determine a time-frequency resource location of each of a first transmission resource and a second transmission resource for data transmission;

a first transmitting module, configured to transmit data on the first transmission resource, where the data that is transmitted includes at least sidelink control information SCI used to indicate the time-frequency resource location of the second transmission resource; and the second transmission resource is transmitted after the first transmission resource; and a first receiving module, configured to determine a target transmission resource of a resource conflict indication channel used to receive resource conflict indication information, where the resource conflict indication information is used to indicate that a resource conflict occurs on the second transmission resource;

there is at least a minimum interval time between the first transmission resource and the second transmission resource, and the minimum interval time includes a first interval time and a second interval time;

there is at least a first interval time between the first transmission resource and the target transmission resource, and there is at least a second interval time between the target transmission resource and the second transmission resource.

According to a fifth aspect, an embodiment of the present disclosure provides a sidelink data transmission apparatus, applied to a second terminal, including:

a second receiving module, configured to receive data transmitted by a first terminal on a first transmission resource, where the data that is transmitted includes at least SCI used to indicate a time-frequency resource location of a second transmission resource; and the second transmission resource is transmitted after the first transmission resource; and a second determining module, configured to determine, based on the SCI, a target transmission resource of a resource conflict indication channel used to transmit resource conflict indication information, where the resource conflict indication information is used to indicate that a resource conflict occurs on the second transmission resource;

there is at least a first interval time between the first transmission resource and the target transmission resource, and there is at least a second interval time between the target transmission resource and the second transmission resource.

According to a sixth aspect, an embodiment of the present disclosure provides a computer-readable storage medium, on which a computer program is stored. When the computer program is executed by a processor, steps of the sidelink data transmission method according to the first aspect are implemented, or steps of the sidelink data transmission method according to the second aspect are implemented.

Beneficial effects of the foregoing technical solutions in the present disclosure are as follows.

In embodiments of the present disclosure, when the first terminal performs resource selection, any two selected transmission resources are separated by a minimum interval time. In this way, after receiving data sent by the first terminal, the second terminal can effectively indicate a resource on which a conflict occurs, thereby improving data transmission reliability.

BRIEF DESCRIPTION OF THE DRAWINGS

FIG. 5 is a schematic flowchart of a sidelink data transmission method according to an embodiment of the present disclosure.

FIG. 6 is a schematic principle diagram of a sidelink data transmission method according to an embodiment of the present disclosure.

FIG. 11 is a schematic diagram of a first interval time according to an embodiment of the present disclosure.

FIG. 12 is a schematic diagram of a window associated with a resource conflict indication channel resource set according to another embodiment of the present disclosure.

FIG. 13 is a schematic diagram of a second interval time according to an embodiment of the present disclosure.

FIG. 14 is a schematic flowchart of a sidelink data transmission method according to another embodiment of the present disclosure.

FIG. 15 is a structural block diagram of a sidelink data transmission apparatus according to an embodiment of the present disclosure.

FIG. 16 is a structural block diagram of a sidelink data transmission apparatus according to another embodiment of the present disclosure.

DETAILED DESCRIPTION OF THE EMBODIMENTS

Figure 1:
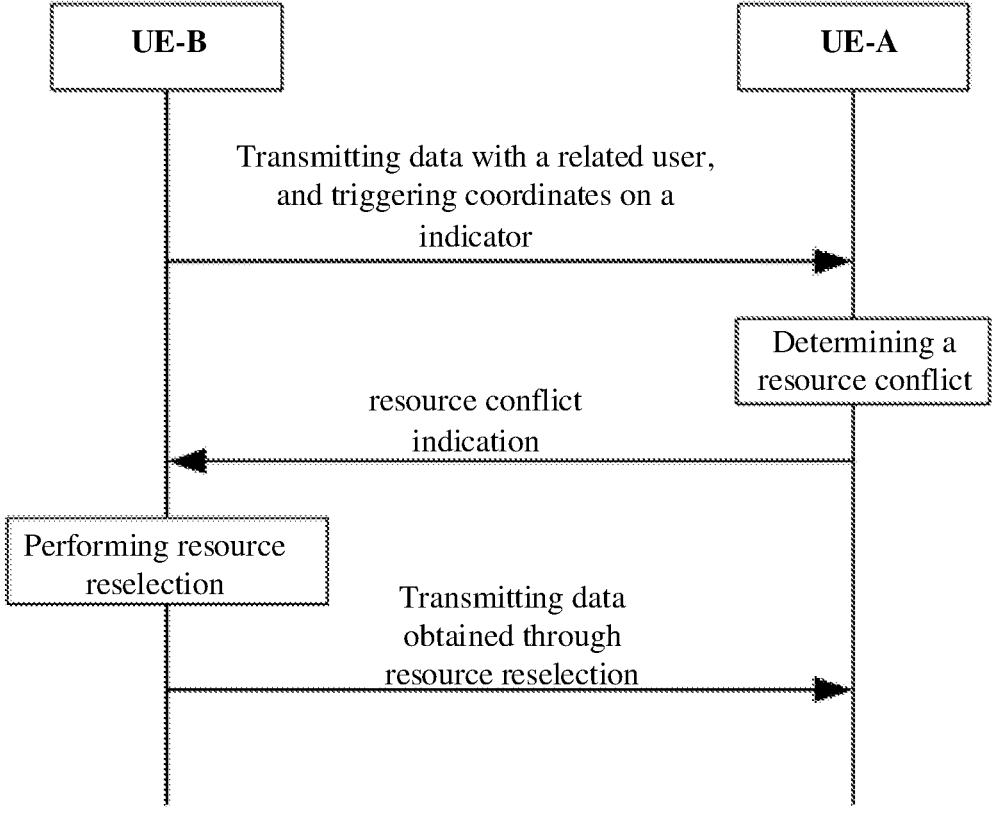
FIG. 1 is a schematic interaction diagram of solution 2 of coordination between terminals.

To make the technical problems to be solved, technical solutions, and advantages of the present disclosure clearer, the following describes the present disclosure in detail with reference to the accompanying drawings and specific embodiments. In the following description, specific details such as specific configurations and components are provided only to help fully understand the embodiments of the present disclosure. Therefore, a person skilled in the art should understand that various changes and modifications may be made to the embodiments described herein without departing from the scope and spirit of the present disclosure. In addition, for clarity and simplicity, descriptions of known functions and constructions are omitted.

It should be understood that, "one embodiment" and "an embodiment" throughout this specification means that specific features, structures or characteristics related to the embodiments may be included in at least one embodiment of the present disclosure. Therefore, descriptions of "in one embodiment" or "in an embodiment" in various places throughout this specification are not necessarily referring to a same embodiment. In addition, the specific features, structures, or characteristics may be combined in one or more embodiments in any appropriate manner.

In the embodiments of the present disclosure, it should be understood that, sequence numbers of the foregoing processes do not mean execution sequences. The execution sequences of the processes should be determined according to functions and internal logic of the processes, and should not be construed as any limitation on the implementation processes of the embodiments of the present disclosure.

The terms "system" and "network" in this specification may often be used interchangeably.

In the embodiments of the present disclosure, it should be understood that, "B that is corresponding to A" means that B is associated with A, and B may be determined based on A. However, it should also be understood that, determining B based on A does not mean determining B based only on A, but instead B may be determined based on A and/or other information.

In embodiments of the present disclosure, a form of an access network is not limited, and may be an access network including a macro base station, a pico base station, Node B (name of a 3G mobile base station), an enhanced base station (eNB), a home enhanced base station (Femto eNB or Home eNode B or Home eNB or HeNB), a relay station, an access point, a remote radio unit (RRU), a remote radio head (RRH), and the like. The user terminal may be a mobile phone (or a smart phone), or another device that can send or receive a wireless signal, including user equipment, a personal digital assistant (PDA), a wireless modem, a wireless communications apparatus, a handheld apparatus, a laptop computer, a cordless phone, a wireless local loop (WLL) station, a customer premise equipment (CPE) or a mobile smart hotspot that can convert a mobile signal into a wireless fidelity (Wi-Fi) signal, a smart home appliance, or a device that can communicate with a mobile communications network spontaneously without being operated by anyone.

Description of a resource selection mode in NR-V2X sidelink is as follows.

A resource assignment method of the NR-V2X sidelink includes two resource assignment modes. One is a base station scheduling mode, referred to as mode 1. A main application scenario is that when a V2X terminal is in coverage of a cellular network, a base station schedules the V2X terminal to transmit a resource in sidelink. In this resource assignment mode, the terminal does not need to perform a resource sensing operation. The other is a mode in which a terminal independently performs resource selection, referred to as mode 2. A main application scenario is that when a V2X terminal is not in coverage of a cellular network, or when a V2X terminal is in coverage of a cellular network, the V2X terminal independently performs resource selection in a mode 2 resource pool preconfigured or configured by the cellular network.

In a resource selection manner of the NR-V2X mode 2, when data arrives or resource reselection is triggered at a time n on the terminal, the terminal predicts, in a resource sensing window, an available resource set in the resource selection window based on SCI sent by another terminal and an associated reference signal received power (RSRP) measurement value that are detected, where a time domain granularity and a frequency domain granularity of resource sensing are respectively slot and sub-channel.

In NR-V2X mode 2, a re-evaluation mechanism and a pre-emption mechanism are added to solve resource collisions caused by a non-periodic burst service and ensure reliability of a high-priority service, respectively. The re-evaluation mechanism is mainly for a resource that is not reserved. Before a resource is sent, it is determined, based on the latest sensing result, whether a selected resource collides. If a collision has occurred, reselection may be performed, so as to reduce a probability of a resource collision. The pre-emption mechanism is mainly for a resource that has been reserved. If it is found that the resource that has been reserved is occupied by a high-priority UE (UE), a low-priority UE is triggered to perform resource reselection, so as to avoid collision between a high-priority service and a low-priority service, thereby ensuring performance of the high-priority service.

Description of a physical channel structure of the NR-V2X sidelink is as follows.

Figure 2:
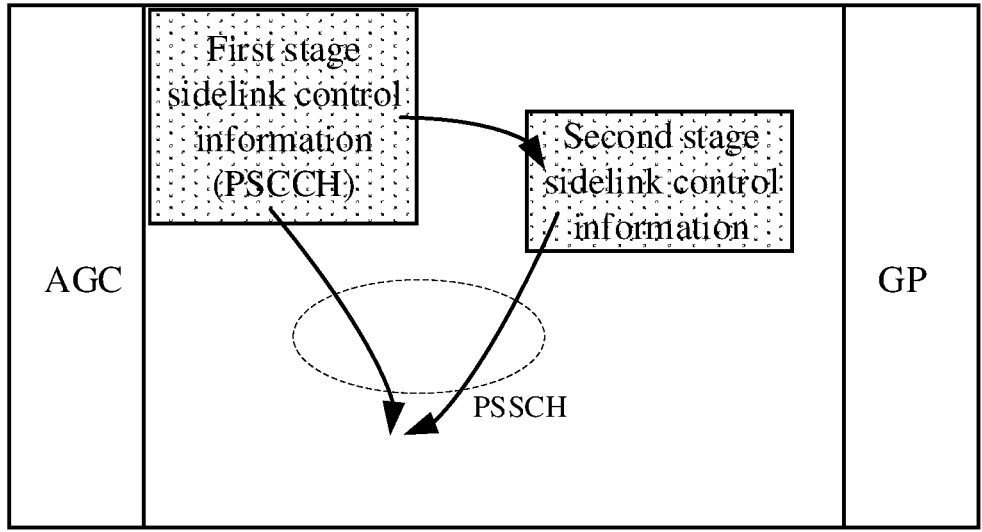
FIG. 2 is a schematic structural diagram of a slot without including a physical sidelink feedback channel (PSFCH) in new radio (NR) vehicle-to-everything (V2X) according to an embodiment of the present disclosure.
Figure 3:
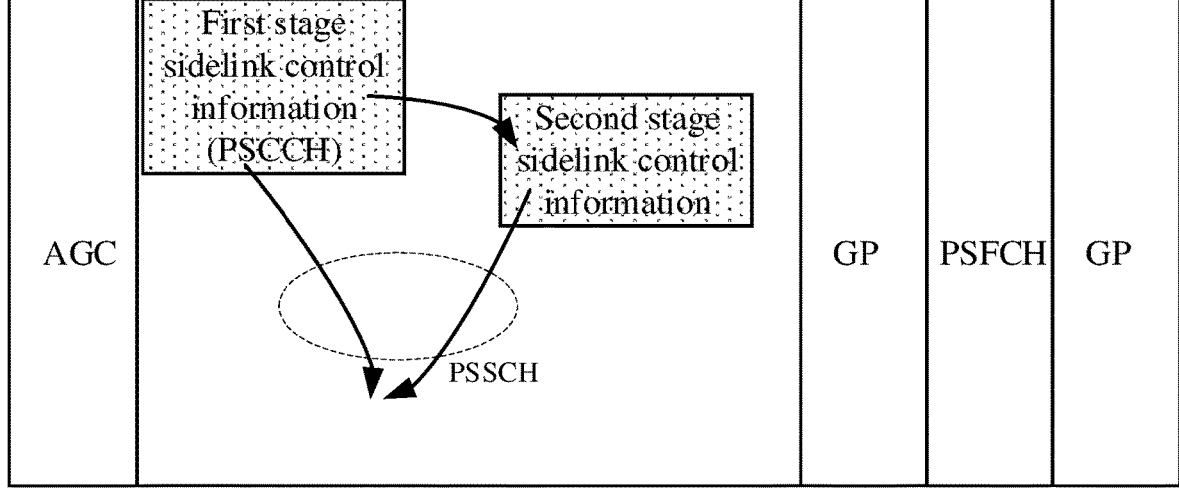
FIG. 3 is a schematic structural diagram of a slot including a PSFCH in NR-V2X according to an embodiment of the present disclosure.

A channel structure of the NR V2X is shown in FIG. 2 and FIG. 3, and includes a physical sidelink control channel (PSCCH), a physical sidelink shared channel (PSSCH), and a PSFCH. The PSCCH carries first-stage sidelink control information (1st-stage SCI), and some resources in the PSSCH carry second-stage sidelink control information (2nd-stage SCI) and data. The PSFCH carries hybrid automatic repeat request (HARQ) acknowledgement (ACK) or negative acknowledge (NACK) feedback information in a sequence-based transmission manner. The PSCCH continuously occupies two or three OFDM symbols from the second orthogonal frequency division multiple access (OFDM) symbol. If a current slot includes a PSFCH channel resource, each PSFCH channel occupies the penultimate OFDM symbol and the antepenultimate OFDM symbol in a slot in time domain, and occupies one physical resource block in frequency domain. The two OFDM symbols used for PSFCH transmission are transmitted in a repeated manner.

There is currently only one format for the 1st-stage SCI, namely, SCI format 1-A, which is mainly used to schedule PSSCH and 2nd-stage SCI, and includes following information domains: a priority, frequency domain resource assignment, time domain resource assignment, a resource reservation period, a demodulation reference signal (DMRS) mode (DMRS pattern), a second-stage SCI format (2nd-stage SCI format), a beta offset indicator, number of DMRS port, a modulation and coding scheme (MCS) table indicator (Additional MCS table indicator), PSFCH overhead indication (PSFCH overhead indication), a reserved bit, and a cyclic redundancy check code (CRC) bit (24 bits).

The 1st-stage SCI implicitly indicates a corresponding TB resource location by using a time-frequency location of the 1st-stage SCI, indicates, by using frequency resource assignment and time resource assignment, a retransmission location reserved for a current transmission block (TB), and indicates, by using the resource reservation period, a resource location reserved for a next TB. In other words, if a service is periodic, a relative time-frequency location of a resource in each period remains unchanged until transmission of the service is completed.

The 2nd-stage SCI currently includes two formats, where SCI format 2-A is used for PSSCH decoding and communication based on ACK/NACK HARQ or NACK-based HARQ or no HARQ feedback, and SCI format 2-B is used for PSSCH decoding and communication based on NACK-based HARQ or no HARQ feedback.

Figure 4:
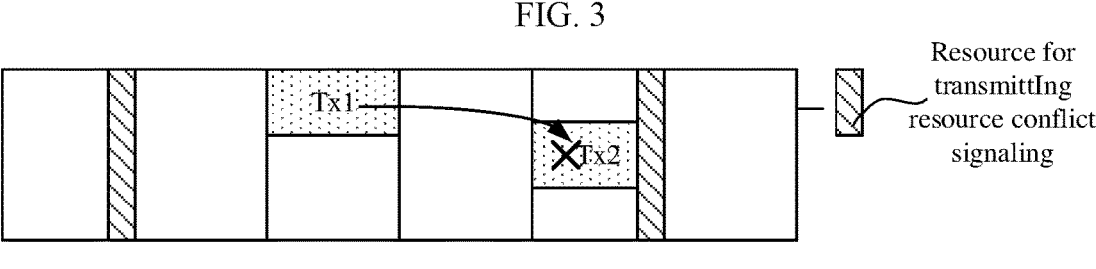
FIG. 4 is a schematic diagram of a scenario in which a resource conflict cannot be indicated according to an embodiment of the present disclosure.

In some scenarios, as shown in FIG. 4, resource conflict signaling is indicated by using a method similar to that of the PSFCH. It is assumed that there are four slots in a configured period, and two transmission resources of one TB selected by a coordinated terminal are respectively Tx1 and Tx2. After receiving Tx1, the coordinated terminal learns that a resource conflict occurs on the transmission resource Tx2. However, because there is no resource used for transmitting resource conflict signaling between Tx2 and Tx1, the resource conflict occurring on Tx2 cannot be effectively indicated.

Specifically, embodiments of the present disclosure provide a sidelink data transmission method and an apparatus, and a terminal. This solves a problem that it is difficult to effectively indicate a resource conflict in some scenarios in a related technology, so that a resource on which a conflict occurs can be effectively indicated, thereby improving data transmission reliability.

Embodiment 1

As shown in FIG. 5, an embodiment of the present disclosure provides a sidelink data transmission method, which is applied to a first terminal and specifically includes following steps.

Step 51: Determining a time-frequency resource location of each of a first transmission resource and a second transmission resource for data transmission.

Step 52: Transmitting data on the first transmission resource, where the data that is transmitted includes at least sidelink control information SCI used to indicate the time-frequency resource location of the second transmission resource; and the second transmission resource is transmitted after the first transmission resource.

It should be noted that the first transmission resource in this embodiment of the present disclosure is earlier than the second transmission resource.

Step 53: Determining a target transmission resource of a resource conflict indication channel used to receive resource conflict indication information, where the resource conflict indication information is used to indicate that a resource conflict occurs on the second transmission resource.

There is at least a minimum interval time between the first transmission resource and the second transmission resource, and the minimum interval time includes a first interval time and a second interval time.

There is at least a first interval time between the first transmission resource and the target transmission resource, and there is at least a second interval time between the target transmission resource and the second transmission resource.

In this embodiment, as shown in FIG. 6, when a coordinated terminal (namely, the first terminal, for example, UE-B) performs resource selection, a minimum interval time (for example, a minimum interval time denoted by Z) is required between any two transmission resources selected by the coordinated terminal. In other words, an interval between any two transmission resources is at least Z, where Z includes at least two parts of time, which are respectively a first interval time (for example, a first interval time denoted by a) and a second interval time (for example, a second interval time denoted by b), and $Z=a+b$.

It should be noted that the target transmission resource is a transmission resource of the resource conflict indication channel used to transmit the resource conflict indication information, and the transmission resource includes a slot location, a physical resource block (PRB) location in frequency domain, and a resource index.

In this embodiment, when the first terminal performs resource selection, any two selected transmission resources are separated by a minimum interval time. In this way, after receiving data sent by the first terminal, a second terminal can effectively indicate a resource on which a conflict occurs, thereby improving data transmission reliability.

It should be noted that the resource conflict indication information in this embodiment of the present disclosure may be transmitted in a manner similar to PSFCH, that is, the resource conflict indication channel is used to transmit the resource conflict indication information. Considering compatibility with an old version of the NR-V2X, the resource conflict indication channel and the PSFCH need to be configured in a same slot. In other words, a period configured for the resource conflict indication channel is consistent with a period configured for the PSFCH.

Optionally, the first interval time is a time interval starting from a first time at which transmission of the SCI on the first transmission resource ends and ending at a start time of a first resource of the closest resource conflict indication channel.

There is at least a minimum resource conflict detection processing time between the first time and the start time of the first resource.

In other words, the first interval time a represents a duration between the last OFDM symbol for SCI transmission in the first transmission resource and the first OFDM symbol of the closest resource conflict indication channel resource that meets a minimum resource conflict detection processing time, that is, starting from the last OFDM symbol for SCI transmission in the first transmission resource and ending at a symbol prior to the closest resource conflict indication channel resource that meets the minimum resource conflict detection processing time.

Optionally, the first interval time is determined based on at least one of the following:

the minimum resource conflict detection processing time;

the time-frequency resource location of the first transmission resource; and configuration information of the resource conflict indication channel resource.

In this embodiment, the configuration information of the resource conflict indication channel resource may include a period of a resource corresponding to the resource conflict indication channel, and configuration of the period is shared by a resource pool.

Optionally, the minimum resource conflict detection processing time (for example, a minimum resource conflict detection processing time denoted by a1) includes at least one of the following:

a processing time of decoding of the SCI;

a time used when a terminal switches from a receiving state to a transmitting state or from a transmitting state to a receiving state; and a preparation time for transmitting the resource conflict indication channel.

Optionally, the second interval time is a time interval starting from a second time at which the target transmission resource ends and ending at a start time of the second transmission resource.

There is at least a minimum transmission processing time between the second time and the start time of the second transmission resource.

In other words, the second interval time b represents a time interval between the last symbol of the resource conflict indication channel and a start OFDM symbol of the second transmission resource.

Optionally, the second interval time is determined based on at least one of the following:

a minimum transmission processing time;

the time-frequency resource location of the second transmission resource; and configuration information of the resource conflict indication channel resource.

In this embodiment, the configuration information of the resource conflict indication channel resource may include a period of a resource corresponding to the resource conflict indication channel, and configuration of the period is shared by a resource pool.

Optionally, the minimum transmission processing time (for example, b1) includes at least one of the following:

a time for receiving and processing the resource conflict indication channel;

a time used when the terminal performs resource selection;

a time used when the terminal prepares for transmission; and a time used when the terminal switches between a transmitting state and a receiving state.

Optionally, the determining a target transmission resource of a resource conflict indication channel used to receive resource conflict indication information includes:

determining a candidate resource set of transmission resource used to receive the resource conflict indication channel, where the candidate resource set includes a slot location and a physical resource block PRB location in frequency domain that are corresponding to the transmission resource; and determining the target transmission resource based on the candidate resource set.

Figures 7, 8, 9, 10:
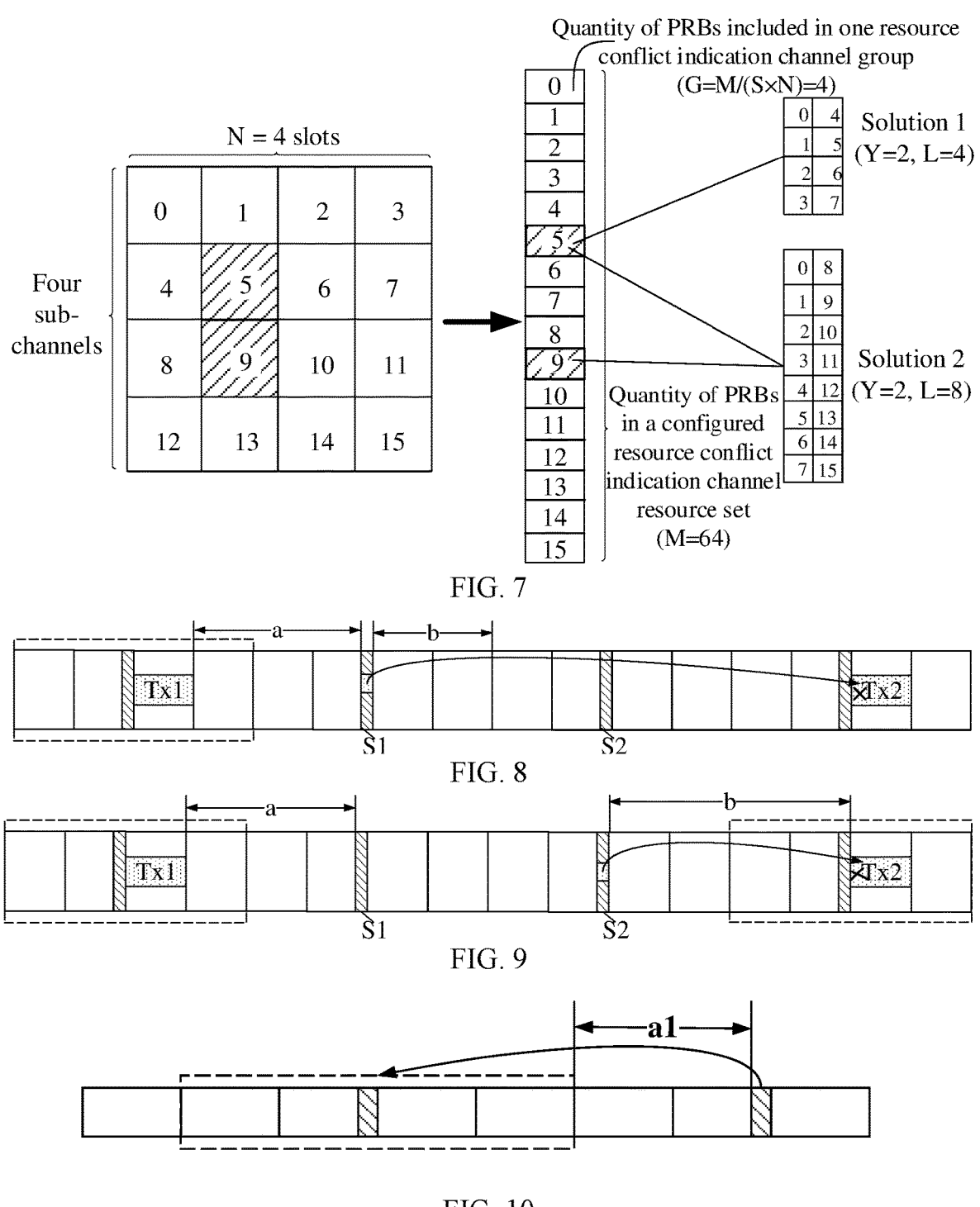
FIG. 7 is a schematic diagram of determining a candidate resource set according to an embodiment of the present disclosure.
FIG. 8 is a schematic diagram of feeding back resource conflict indication information according to an embodiment of the present disclosure.
FIG. 9 is a schematic diagram of feeding back resource conflict indication information according to another embodiment of the present disclosure.
FIG. 10 is a schematic diagram of a window associated with a resource conflict indication channel resource set according to an embodiment of the present disclosure.

FIG. 7 is a schematic diagram of determining a candidate resource set according to an embodiment of the present disclosure.

In an optional embodiment of the present disclosure, a resource pool is configured as follows.

A period of a resource conflict indication channel is N (for example, N=4), and there are M (for example, M=64) physical resource blocks (PRB) in frequency domain, and a quantity of sequence pairs that are allowed to be transmitted and orthogonally multiplexed in each PRB is Y (for example, Y=2). Herein a ZC sequence is generally used. Therefore, Y may be represented by using a quantity of cyclic shift pairs.

The resource pool includes S (for example, S=4) subchannels in frequency domain, which is equivalent to that a quantity of resource units in a window associated with a resource conflict indication channel resource set is S*N=16.

A quantity of PRBs included in one resource conflict channel group is G, where G=M/(S*N)=4.

It should be noted that, each resource conflict indication channel group is associated with a resource unit in a window that is associated with a resource conflict indication channel resource set. As shown in FIG. 7, a resource conflict indication channel group and a resource unit that have a same number are associated.

Optionally, the candidate resource set is determined based on at least one of the following:

a time-frequency resource location of the first transmission resource; and a time-frequency resource location of the second transmission resource.

Determining the candidate resource set is described in detail below.

(I) The determining the candidate resource set based on the time-frequency resource location of the first transmission resource is specifically as follows.

During determining of the candidate resource set, if the candidate resource set is determined based on the time-frequency resource location of the first transmission resource, the candidate resource set is associated with a location of a time-frequency resource occupied by the first transmission resource in a resource conflict indication association window and a candidate resource conflict indication channel group may be determined based on a number of a resource unit occupied by the first transmission resource.

Resource units in a transmission window may be numbered in a manner of firstly in time domain and then in frequency domain (as shown in FIG. 7) or firstly in frequency domain and then in time domain.

It should be noted that, determining the candidate resource set in this manner mainly includes the following two solutions.

Solution 1: A corresponding resource conflict channel group is determined as the candidate resource set based on a resource unit with the smallest number in resource units occupied by the first transmission resource.

For example, as shown in FIG. 7, in Solution 1, when the first transmission resource occupies two resource units numbered 5 and 9, the resource conflict indication channel group corresponds to a resource conflict channel group that is corresponding to the resource unit 5, and a quantity L of PRBs in the candidate resource set is 4.

Solution 2: A corresponding resource conflict channel group is determined as the candidate resource set based on all resource units occupied by the first transmission resource.

For example, as shown in FIG. 7, in Solution 2, when the first transmission resource occupies two resource units numbered 5 and 9, the resource conflict indication channel group corresponds to a resource conflict channel group that is corresponding to the resource units 5 and 9, and a quantity L of PRBs in the candidate resource set is 8.

Optionally, in a case in which the candidate resource set is determined based on the time-frequency resource occupied by the first transmission resource, a length of the second interval time is a minimum transmission processing time.

In this embodiment, the second interval time b is a minimum transmission processing time b1, and impact of an additional interval time b2 does not need to be considered.

In addition, it should be noted that, in this embodiment, as shown in FIG. 8, the second terminal, using resource conflict indication information, feeds back a resource conflict on the second transmission resource in a slot that is located after SCI transmission in the first transmission resource, meets the first interval time a, and is the earliest slot including a resource conflict indication channel.

It should be noted that in this embodiment, it may be agreed that the resource conflict indication information indicates only a resource conflict that occurs on a next transmission resource subsequent to a current transmission resource. For example, if the current transmission resource is the first transmission resource, the resource conflict indication information indicates only a resource conflict that occurs on the second transmission resource.

(II) The determining the candidate resource set based on the time-frequency resource location of the second transmission resource is specifically as follows.

During determining of the candidate resource set, if the candidate resource set is determined based on the time-frequency resource location of the second transmission resource, the candidate resource set is associated with a location of a time-frequency resource occupied by the second transmission resource in a resource conflict indication association window, and a candidate resource conflict indication channel group may be determined based on a number of a resource unit occupied by the second transmission resource.

Resource units in a transmission window may be numbered in a manner of firstly in time domain and then in frequency domain (as shown in FIG. 7) or firstly in frequency domain and then in time domain.

It should be noted that, determining the candidate resource set in this manner mainly includes the following two solutions.

Solution 1: A corresponding resource conflict channel group is determined as the candidate resource set based on a resource unit with the smallest number in resource units occupied by the second transmission resource.

For example, as shown in FIG. 7, in Solution 1, when the second transmission resource occupies two resource units numbered 5 and 9, the resource conflict indication channel group corresponds to a resource conflict channel group that is corresponding to the resource unit 5.

Solution 2: A corresponding resource conflict channel group is determined as the candidate resource set based on all resource units occupied by the second transmission resource.

For example, as shown in FIG. 7, in Solution 2, when the second transmission resource occupies two resource unis numbered 5 and 9, the resource conflict indication channel group corresponds to a resource conflict channel group that is corresponding to the resource units 5 and 9.

Optionally, in a case in which the candidate resource set is determined based on a time-frequency resource occupied by the second transmission resource, the candidate resource set is determined based on at least one of the following:

a minimum transmission processing time;

the time-frequency resource location of the second transmission resource; and configuration information of the resource conflict indication channel resource.

It should be noted that in this embodiment, after a first interval time a following the SCI transmission in the first transmission resource, a transmission resource (namely, a target transmission resource) of a specific resource conflict indication channel needs to be determined based on the time-frequency resource location of the second transmission resource.

It should be noted herein that, when an interval between the first transmission resource and the second transmission resource is relatively large in time domain, as shown in FIG. 9, although the second terminal may feed back the resource conflict on the second transmission resource in a slot (location of the first slot S1 shown in FIG. 9) that is located after the first transmission resource and is the earliest slot including the resource conflict indication channel, the resource conflict needs to be fed back after a period of time because the second transmission resource is only associated with a resource conflict indication channel in the second slot S2 (as shown in FIG. 9), and thus the second terminal cannot learn the resource conflict early and also cannot perform resource reselection as early as possible.

Optionally, in the determined candidate resource set, the target transmission resource is determined based on at least one of the following:

a cyclic redundancy check CRC bit in first stage sidelink control information 1st-stage SCI, where the 1st-stage SCI is 1st-stage SCI of SCI in the first transmission resource;

source identity (ID) information in second stage sidelink control information 2nd-stage SCI, where the 2nd-stage SCI is 2nd-stage SCI of SCI in the first transmission resource;

a quantity of PRBs in the candidate resource set; and a quantity of sequence pairs allowed to be orthogonally multiplexed in one PRB.

In this embodiment, a transmission resource of the resource conflict indication information is determined by using the CRC bit in the 1st-stage SCI, so that the transmission resource may be effectively associated with the first terminal, and a conflict between transmission resources of the resource conflict indication information in a case of multiple users may be avoided.

It should be further noted that, resource indexes of the resource conflict indication channel in a candidate resource set may be numbered in a manner of firstly in frequency domain and then in code domain, or firstly in code domain and then in frequency domain.

In an optional embodiment of the present disclosure, a specific resource index may be represented as follows:

$$Resoure\_index=(K)Mod(L*Y).$$

K is determined based on a CRC bit in the 1st-stage SCI or a source ID (namely, source ID) in the 2nd-stage SCI.

In this embodiment, when a target transmission resource on which resource conflict occurs is determined by using only the 1st-stage SCI, a processing delay may be effectively reduced, and the transmission resource of the resource conflict indication information is determined by using the CRC bit in the 1st-stage SCI, so that the transmission resource may be effectively associated with the first terminal, and a conflict between transmission resources of the resource conflict indication information in a case of multiple users may be avoided.

In other words, using of the CRC of the 1st-stage SCI has following effects: a delay may be effectively reduced, and only decoding of a PSCCH is required, without needing to wait a complete transmission of the PSSCH; and in addition, a same function as using the source ID may be achieved, so that a conflict between transmission resources of a resource conflict indication channel between users can be avoided.

Optionally, the SCI includes 1st-stage SCI and/or 2nd-stage SCI.

In a case in which the SCI is the 1st-stage SCI, the last orthogonal frequency division multiple access OFDM symbol for transmitting the SCI is the last OFDM symbol for transmitting a physical sidelink control channel PSCCH, and decoding of the SCI is decoding of the PSCCH.

In a case in which the SCI includes the 1st-stage SCI and the 2nd-stage SCI, the last OFDM symbol for SCI transmission is the last OFDM symbol for transmitting the physical sidelink shared channel PSSCH, and decoding of the SCI includes decoding of the 1st-stage SCI and decoding of the 2nd-stage SCI.

In other words, the definition of SCI transmission or SCI decoding includes the following two cases.

Case 1: The SCI for resource coordination between terminals includes only the 1st-stage SCI. In this case, the last OFDM symbol for SCI transmission represents the last OFDM symbol for transmitting the PSCCH, and correspondingly, decoding of the SCI is also only for decoding of the PSCCH.

Case 2: The SCI for resource coordination between terminals includes the 1st-stage SCI and the 2nd-stage SCI. In this case, the last OFDM symbol for SCI transmission represents the last OFDM symbol for transmitting the PSSCH, and correspondingly, decoding of the SCI includes decoding of the 1st-stage SCI and decoding of the 2nd-stage SCI.

Optionally, a slot of the target transmission resource is associated with the first transmission resource, and the associated first transmission resource is in N continuous slots located before the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

In this embodiment, as shown in FIG. 10 (for example, N=4), a slot of each resource conflict indication channel resource is associated with a first transmission resource in N slots located before the slot and meeting a requirement of a minimum resource conflict detection processing time a1, and the N slots are continuous N slots in the resource pool.

As shown in FIG. 11, a slot of a resource conflict indication channel that can feed back a resource conflict earliest is associated with a transmission window of a first transmission resource (namely, a location shown in a dotted line box in the figure), and the transmission window is N slots having an interval time with a slot of the resource conflict indication channel resource and located before the slot, and the interval time meets a requirement of a minimum resource conflict detection processing time a1.

Herein, the first interval time a is described as follows. As shown in FIG. 11, the first interval time a includes at least two parts of time, namely, the minimum resource conflict detection processing time a1 and an interval time a2, where a2 is separately related to a period of the resource conflict indication channel and the specific time-frequency resource location of the first transmission resource. It should be noted that, a2 may be a variable value.

Optionally, a slot of the target transmission resource is associated with the second transmission resource, and the associated second transmission resource is in N continuous slots located after the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

In this embodiment, as shown in FIG. 12, a slot of each resource conflict indication channel resource is associated with a second transmission resource in N slots located after a slot meeting a requirement of a minimum transmission processing time b1, and the N slots are continuous N slots in the resource pool.

Herein, the second interval time b is described as follows. As shown in FIG. 13, the second interval time b includes two parts of time, one is the minimum transmission processing time b1, and the other is an interval time b2, which is separately related to a period of the resource conflict indication channel and the specific time-frequency resource location of the second transmission resource. It should be noted that the interval time b2 may be a variable value.

Optionally, the data that is transmitted further includes SCI used to indicate a time-frequency resource location of a third transmission resource. The third transmission resource is a resource reserved by the first terminal.

The first transmission resource, the second transmission resource, and the third transmission resource are arranged in chronological order.

In this embodiment, it should be noted that the data that is transmitted may include SCI of time-frequency resource locations of a plurality of transmission resources (namely, transmission resources, for example, the first transmission resource and the second transmission resource). Herein information including three transmission resources is used as an example, and the three transmission resources are arranged in chronological order as follows: the first transmission resource, the second transmission resource, and the third transmission resource. Specific examples are as follows.

Case 1: When the second terminal learns, in the SCI of the first transmission resource, that a resource conflict occurs on the second transmission resource, the second terminal transmits resource conflict indication information in a transmission resource corresponding to the time-frequency resource location of the first transmission resource, and the resource conflict indication information specifically indicates that a resource conflict occurs on the second transmission resource.

Case 2: When the second terminal learns, in the SCI of the first transmission resource, that a resource conflict occurs only on the third transmission resource, resource conflict is not indicated. It should be noted herein that, the resource conflict on the third transmission resource may be determined based on the SCI of the second transmission resource.

In other words, in this embodiment of the present disclosure, it may be agreed that the resource conflict indication information indicates only a resource conflict that occurs on a next transmission resource subsequent to a current transmission resource. For example, if the current transmission resource is the first transmission resource, the resource conflict indication information indicates only a resource conflict that occurs on the second transmission resource.

Optionally, the sidelink data transmission method further includes:

detecting resource conflict indication information on a target transmission resource; and when the resource conflict indication information sent by the second terminal is detected, performing resource reselection based on the resource conflict indication information.

In this embodiment, the first terminal may determine a target transmission resource of the resource conflict indication channel associated with the second transmission resource. In this way, if the resource conflict indication information is detected in the target transmission resource, resource reselection can be triggered for the second transmission resource.

In this embodiment of the present disclosure, when the first terminal performs resource selection, any two selected transmission resources are separated by a minimum interval time. In this way, after receiving data sent by the first terminal, the second terminal can effectively indicate a resource on which a conflict occurs, thereby improving data transmission reliability.

Embodiment 2

As shown in FIG. 14, an embodiment of the present disclosure provides a sidelink data transmission method, which is applied to a second terminal and specifically includes following steps.

Step 1401: Receiving data transmitted by a first terminal on a first transmission resource, where the data that is transmitted includes at least SCI used to indicate a time-frequency resource location of a second transmission resource; and the second transmission resource is transmitted after the first transmission resource.

It should be noted that the first transmission resource in this embodiment of the present disclosure is earlier than the second transmission resource.

Step 1402: Determining, based on the SCI, a target transmission resource of a resource conflict indication channel used to transmit resource conflict indication information, where the resource conflict indication information is used to indicate that a resource conflict occurs on the second transmission resource.

There is at least a first interval time between the first transmission resource and the target transmission resource, and there is at least a second interval time between the target transmission resource and the second transmission resource.

It should be noted that the target transmission resource is a transmission resource of the resource conflict indication channel used to transmit the resource conflict indication information, and the transmission resource includes a slot location, a PRB location in frequency domain, and a resource index.

In this embodiment, as shown in FIG. 6, when a coordinated terminal (namely, the second terminal, for example, UE-A) receives data (the data includes the SCI) sent by the first terminal on the first transmission resource, whether a resource conflict occurs on the second transmission resource reserved by the first terminal may be determined. If a resource conflict occurs, the second terminal may determine, in a slot meeting a first interval time a based on the SCI on the first transmission resource, a transmission resource (namely, the target transmission resource) of the resource conflict indication channel associated with the second transmission resource, and feed back (that is, transmit) the resource conflict indication information in the target transmission resource. In this way, resource conflict can be effectively indicated, thereby improving data transmission reliability.

For the second terminal, a slot location of a transmission resource of a resource conflict indication channel for indicating a resource conflict may be in a slot that meets a first interval time and is the closest slot including a resource of a resource conflict indication channel, so that the second terminal can indicate to the first terminal earlier that the resource conflict occurs.

In this embodiment, a resource on which a resource conflict will occur in future can be effectively indicated.

Optionally, the first interval time is a time interval starting from a first time at which transmission of the SCI on the first transmission resource ends and ending at a start time of a first resource of the closest resource conflict indication channel.

There is at least a minimum resource conflict detection processing time between the first time and the start time of the first resource.

In other words, the first interval time a represents a duration between the last OFDM symbol for SCI transmission in the first transmission resource and the first OFDM symbol of the closest resource conflict indication channel resource that meets a minimum resource conflict detection processing time, that is, starting from the last OFDM symbol for SCI transmission in the first resource and ending at a symbol prior to the closest resource conflict indication channel resource that meets the minimum resource conflict detection processing time.

Optionally, the first interval time is determined based on at least one of the following:

the minimum resource conflict detection processing time;

the time-frequency resource location of the first transmission resource; and configuration information of the resource conflict indication channel resource.

Optionally, the minimum resource conflict detection processing time (for example, a minimum resource conflict detection processing time denoted by a1) includes at least one of the following:

a processing time of decoding of the SCI;

a time used when a terminal switches from a receiving state to a transmitting state or from a transmitting state to a receiving state; and a preparation time for transmitting the resource conflict indication channel.

In this embodiment, the configuration information of the resource conflict indication channel resource may include a period of a resource corresponding to the resource conflict indication channel, and configuration of the period is shared by a resource pool.

Optionally, the second interval time is a time interval starting from a second time at which the target transmission resource ends and ending at a start time of the second transmission resource.

There is at least a minimum transmission processing time between the second time and the start time of the second transmission resource.

In other words, the second interval time b represents a time interval between the last symbol of the resource conflict indication channel and a start OFDM symbol of the second transmission resource.

Optionally, the second interval time is determined based on at least one of the following:

a minimum transmission processing time;

the time-frequency resource location of the second transmission resource; and configuration information of the resource conflict indication channel resource.

In this embodiment, the configuration information of the resource conflict indication channel resource may include a period of a resource corresponding to the resource conflict indication channel, and configuration of the period is shared by a resource pool.

Optionally, the minimum transmission processing time (for example, b1) includes at least one of the following:

a time for receiving and processing the resource conflict indication channel;

a time used when the terminal performs resource selection;

a time used when the terminal prepares for transmission; and a time used when the terminal switches between a transmitting state and a receiving state.

Optionally, the determining a target transmission resource of a resource conflict indication channel used to transmit resource conflict indication information includes:

determining a candidate resource set of transmission resource used to transmit the resource conflict indication channel, where the candidate resource set includes a slot location and a PRB location in frequency domain that are corresponding to the transmission resource; and determining the target transmission resource based on the candidate resource set.

FIG. 7 is a schematic diagram of determining a candidate resource set according to an embodiment of the present disclosure.

In an optional embodiment of the present disclosure, a resource pool is configured as follows.

A period of a resource conflict indication channel is N (for example, N=4), and there are M (for example, M=64) physical resource blocks (PRB) in frequency domain, and a quantity of sequence pairs that are allowed to be transmitted and orthogonally multiplexed in each PRB is Y (for example, Y=2). Herein a ZC sequence is generally used. Therefore, Y may be represented by using a quantity of cyclic shift pairs.

The resource pool includes S (for example, S=4) sub-channels in frequency domain, which is equivalent to that a quantity of resource units in a window associated with a resource conflict indication channel resource set is S*N=16.

A quantity of PRBs included in one resource conflict channel group is G, where G=M/(S*N)=4.

It should be noted that, each resource conflict indication channel group is associated with a resource unit in a window that is associated with a resource conflict indication channel resource set. As shown in FIG. 7, a resource conflict indication channel group and a resource unit that have a same number are associated.

Optionally, the candidate resource set is determined based on at least one of the following:
a time-frequency resource location of the first transmission resource; and
a time-frequency resource location of the second transmission resource.

Determining the candidate resource set is described in detail below.

(I) The determining the candidate resource set based on the time-frequency resource location of the first transmission resource is specifically as follows. During determining of the candidate resource set, if it is determined, based on the time-frequency resource location of the first transmission resource, that the candidate resource set is associated with a location of a time-frequency resource occupied by the first transmission resource in a resource conflict indication association window, a candidate resource conflict indication channel group may be determined based on a number of a resource unit occupied by the first transmission resource.

Resource units in a transmission window may be numbered in a manner of firstly in time domain and then in frequency domain (as shown in FIG. 7) or firstly in frequency domain and then in time domain.

It should be noted that, determining the candidate resource set in this manner mainly includes the following two solutions.

Solution 1: A corresponding resource conflict channel group is determined as the candidate resource set based on a resource unit with the smallest number in resource units occupied by the first transmission resource.

For example, as shown in FIG. 7, in Solution 1, when the first transmission resource occupies two resource units numbered 5 and 9, the resource conflict indication channel group corresponds to a resource conflict channel group that is corresponding to the resource unit 5.

Solution 2: A corresponding resource conflict channel group is determined as the candidate resource set based on all resource units occupied by the first transmission resource.

For example, as shown in FIG. 7, in Solution 2, when the first transmission resource occupies two resource unis numbered 5 and 9, the resource conflict indication channel group corresponds to a resource conflict channel group that is corresponding to the resource units 5 and 9.

Optionally, in a case in which the candidate resource set is determined based on the time-frequency resource occupied by the first transmission resource, a length of the second interval time is a minimum transmission processing time.

In this embodiment, the second interval time b is a minimum transmission processing time b1, and impact of an additional interval time b2 does not need to be considered.

In addition, it should be noted that, in this embodiment, as shown in FIG. 8, resource conflict indication information of the second terminal is used to feed back a resource conflict on the second transmission resource in a slot that is located after SCI transmission in the first transmission resource, meets the first interval time a, and is the earliest slot including a resource conflict indication channel.

It should be noted that in this embodiment, it may be agreed that the resource conflict indication information indicates only a resource conflict that occurs on a next transmission resource subsequent to a current transmission resource. For example, if the current transmission resource is the first transmission resource, the resource conflict indication information indicates only a resource conflict that occurs on the second transmission resource.

(II) The determining the candidate resource set based on the time-frequency resource location of the second transmission resource is specifically as follows.

During determining of the candidate resource set, if it is determined, based on the time-frequency resource location of the second transmission resource, that the candidate resource set is associated with a location of a time-frequency resource occupied by the second transmission resource in a resource conflict indication association window, a candidate resource conflict indication channel group may be determined based on a number of a resource unit occupied by the second transmission resource.

Resource units in a transmission window may be numbered in a manner of firstly in time domain and then in frequency domain (as shown in FIG. 7) or firstly in frequency domain and then in time domain.

It should be noted that, determining the candidate resource set in this manner mainly includes the following two solutions.

Solution 1: A corresponding resource conflict channel group is determined as the candidate resource set based on a resource unit with the smallest number in resource units occupied by the second transmission resource.

For example, as shown in FIG. 7, in Solution 1, when the second transmission resource occupies two resource units numbered 5 and 9, the resource conflict indication channel group corresponds to a resource conflict channel group that is corresponding to the resource unit 5.

Solution 2: A corresponding resource conflict channel group is determined as the candidate resource set based on all resource units occupied by the second transmission resource.

For example, as shown in FIG. 7, in Solution 2, when the second transmission resource occupies two resource units numbered 5 and 9, the resource conflict indication channel group corresponds to a resource conflict channel group that is corresponding to the resource units 5 and 9.

Optionally, in the determined candidate resource set, the target transmission resource is determined based on at least one of the following:
a CRC bit in 1st-stage SCI, where the 1st-stage SCI is 1st-stage SCI of SCI in the first transmission resource;
source ID information in 2nd-stage SCI, where the 2nd-stage SCI is 2nd-stage SCI of the SCI in the first transmission resource;

a quantity of PRBs in the candidate resource set; and a quantity of sequence pairs allowed to be orthogonally multiplexed in one PRB.

In this embodiment, a transmission resource of the resource conflict indication information is determined by using the CRC bit in the 1st-stage SCI, so that the transmission resource may be effectively associated with the first terminal, and a conflict between transmission resources of the resource conflict indication information in a case of multiple users may be avoided.

In an optional embodiment of the present disclosure, a specific resource index may be represented as follows:

Resoure_index=(K)Mod(L*Y).

K is determined based on a CRC bit in the 1st-stage SCI or a source ID in the 2nd-stage SCI.

In this embodiment, when a target transmission resource on which resource conflict occurs is determined by using only the 1st-stage SCI, a processing delay may be effectively reduced, and the transmission resource of the resource conflict indication information is determined by using the CRC bit in the 1st-stage SCI, so that the transmission resource may be effectively associated with the first terminal, and a conflict between transmission resources of the resource conflict indication information in a case of multiple users may be avoided.

In other words, using of the cyclic redundancy check (CRC) of the 1st-stage SCI has the following effects: a delay may be effectively reduced, and only decoding of a PSCCH is required, without needing to wait a complete transmission of the PSSCH; and in addition, a same function as using the source ID may be implemented, so that a conflict between transmission resources of a resource conflict indication channel between users can be avoided.

Optionally, a slot of the target transmission resource is associated with the first transmission resource, and the associated first transmission resource is in N continuous slots located before the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

In this embodiment, as shown in FIG. 10 (for example, N=4), a slot of each resource conflict indication channel resource is associated with a first transmission resource in N slots located before the slot and meeting a requirement of a minimum resource conflict detection processing time a1, and the N slots are continuous N slots in the resource pool.

As shown in FIG. 11, a slot of a resource conflict indication channel that can feed back a resource conflict earliest is associated with a transmission window of a first transmission resource (namely, a location shown in a dotted line box in the figure), and the transmission window is N slots having an interval time with a slot of the resource conflict indication channel resource and located before the slot, and the interval time meets a requirement of a minimum resource conflict detection processing time a1.

Herein, the first interval time a is described as follows. As shown in FIG. 11, the first interval time a includes at least two parts of time, namely, the minimum resource conflict detection processing time a1 and an interval time a2, where a2 is separately related to a period of the resource conflict indication channel and the specific time-frequency resource location of the first transmission resource. It should be noted that, a2 may be a variable value.

Optionally, a slot of the target transmission resource is associated with the second transmission resource, and the associated second transmission resource is in N continuous slots located after the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

In this embodiment, as shown in FIG. 12, a slot of each resource conflict indication channel resource is associated with a second transmission resource in N slots located after a slot meeting a requirement of a minimum transmission processing time b1, and the N slots are continuous N slots in the resource pool.

Herein, the second interval time b is described as follows. As shown in FIG. 13, the second interval time b includes two parts of time, one is the minimum transmission processing time b1, and the other is an interval time b2, which is separately related to a period of the resource conflict indication channel and the specific time-frequency resource location of the second transmission resource. It should be noted that the interval time b2 may be a variable value.

Optionally, the data that is transmitted further includes SCI used to indicate a time-frequency resource location of a third transmission resource. The third transmission resource is a resource reserved by the first terminal.

The first transmission resource, the second transmission resource, and the third transmission resource are arranged in chronological order.

In this embodiment, it should be noted that the data that is transmitted may include SCI of time-frequency resource locations of a plurality of transmission resources (namely, transmission resources, for example, the first transmission resource and the second transmission resource). Herein information including three transmission resources is used as an example, and the three transmission resources are arranged in chronological order as follows: the first transmission resource, the second transmission resource, and the third transmission resource. Specific examples are as follows.

Case 1: When the second terminal learns, in the SCI of the first transmission resource, that a resource conflict occurs on the second transmission resource, the second terminal transmits resource conflict indication information in a transmission resource corresponding to the time-frequency resource location of the first transmission resource, and the resource conflict indication information specifically indicates that a resource conflict occurs on the second transmission resource.

Case 2: When the second terminal learns, in the SCI of the first transmission resource, that a resource conflict occurs only on the third transmission resource, resource conflict is not indicated. It should be noted herein that, the resource conflict on the third transmission resource may be determined based on the SCI of the second transmission resource.

In other words, in this embodiment of the present disclosure, it needs to be agreed that the resource conflict indication information indicates only a resource conflict that occurs on a next transmission resource subsequent to a current transmission resource. For example, if the current transmission resource is the first transmission resource, the resource conflict indication information indicates only a resource conflict that occurs on the second transmission resource.

In this embodiment of the present disclosure, the second terminal may determine, after receiving the data sent by the first terminal on the first transmission resource, whether a resource conflict occurs on the second transmission resource reserved by the first terminal. If a resource conflict occurs, a transmission resource (namely, the target transmission resource) of the resource conflict indication channel associated with the second transmission resource may be determined based on the SCI on the first transmission resource, and the resource conflict indication information is fed back in the target transmission resource. In this way, resource conflict can be effectively indicated, thereby improving data transmission reliability.

Embodiment 3

As shown in FIG. 15, an embodiment of the present disclosure provides a sidelink data transmission apparatus 1500, applied to a first terminal and including:

a first determining module 1501, configured to determine a time-frequency resource location of each of a first transmission resource and a second transmission resource for data transmission;

a first transmitting module 1502, configured to transmit data on the first transmission resource, where the data that is transmitted includes at least sidelink control information SCI used to indicate the time-frequency resource location of the second transmission resource; and the second transmission resource is transmitted after the first transmission resource; and a first receiving module 1503, configured to determine a target transmission resource of a resource conflict indication channel used to receive resource conflict indication information, where the resource conflict indication information is used to indicate that a resource conflict occurs on the second transmission resource.

There is at least a minimum interval time between the first transmission resource and the second transmission resource, and the minimum interval time includes a first interval time and a second interval time.

There is at least a first interval time between the first transmission resource and the target transmission resource, and there is at least a second interval time between the target transmission resource and the second transmission resource.

In this embodiment, when the first terminal performs resource selection, any two selected transmission resources are separated by a minimum interval time. In this way, after receiving data sent by the first terminal, a second terminal can effectively indicate a resource on which a conflict occurs, thereby improving data transmission reliability.

Optionally, the first interval time is a time interval starting from a first time at which transmission of the SCI on the first transmission resource ends and ending at a start time of a first resource of the closest resource conflict indication channel.

There is at least a minimum resource conflict detection processing time between the first time and the start time of the first resource.

Optionally, the first interval time is determined based on at least one of the following:

the minimum resource conflict detection processing time;

the time-frequency resource location of the first transmission resource; and configuration information of the resource conflict indication channel resource.

Optionally, the second interval time is a time interval starting from a second time at which the target transmission resource ends and ending at a start time of the second transmission resource.

There is at least a minimum transmission processing time between the second time and the start time of the second transmission resource.

Optionally, the second interval time is determined based on at least one of the following:

a minimum transmission processing time;

the time-frequency resource location of the second transmission resource; and configuration information of the resource conflict indication channel resource.

Optionally, the first receiving module includes:

determine a candidate resource set of transmission resource used to receive the resource conflict indication channel, where the candidate resource set includes a slot location and a physical resource block PRB location in frequency domain that are corresponding to the transmission resource; and determine the target transmission resource based on the candidate resource set.

Optionally, the candidate resource set is determined based on at least one of the following:

the time-frequency resource location of the first transmission resource; and the time-frequency resource location of the second transmission resource.

Optionally, in a case in which the candidate resource set is determined based on the time-frequency resource occupied by the first transmission resource, a length of the second interval time is a minimum transmission processing time.

Optionally, in a case in which the candidate resource set is determined based on a time-frequency resource occupied by the second transmission resource, the candidate resource set is determined based on at least one of the following:

a minimum transmission processing time;

the time-frequency resource location of the second transmission resource; and configuration information of the resource conflict indication channel resource.

Optionally, the target transmission resource is determined based on at least one of the following:

a cyclic redundancy check CRC bit in first stage sidelink control information 1st-stage SCI, where the 1st-stage SCI is 1st-stage SCI of SCI in the first transmission resource;

source identity ID information in second stage sidelink control information 2nd-stage SCI, where the 2nd-stage SCI is 2nd-stage SCI of SCI in the first transmission resource;

a quantity of PRBs in the candidate resource set; and a quantity of sequence pairs allowed to be orthogonally multiplexed in one PRB.

Optionally, a slot of the target transmission resource is associated with the first transmission resource, and the associated first transmission resource is in N continuous slots located before the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

Optionally, a slot of the target transmission resource is associated with the second transmission resource, and the associated second transmission resource is in N continuous slots located after the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

Optionally, the data that is transmitted further includes SCI used to indicate a time-frequency resource location of a third transmission resource. The third transmission resource is a resource reserved by the first terminal.

The first transmission resource, the second transmission resource, and the third transmission resource are arranged in chronological order.

Embodiment 3 of the present disclosure is corresponding to the method in Embodiment 1. All implementation means in Embodiment 1 are applicable to embodiments of the sidelink data transmission apparatus, and a same technical effect can be achieved.

Embodiment 4

As shown in FIG. 16, an embodiment of the present disclosure provides a sidelink data transmission apparatus 1600, applied to a second terminal and including:

a second receiving module 1601, configured to receive data transmitted by a first terminal on a first transmission resource, where the data that is transmitted includes at least SCI used to indicate a time-frequency resource location of a second transmission resource; and the second transmission resource is transmitted after the first transmission resource; and a second determining module 1602, configured to determine, based on the SCI, a target transmission resource of a resource conflict indication channel used to transmit resource conflict indication information, where the resource conflict indication information is used to indicate that a resource conflict occurs on the second transmission resource.

There is at least a first interval time between the first transmission resource and the target transmission resource, and there is at least a second interval time between the target transmission resource and the second transmission resource.

In this embodiment, when a coordinated terminal (namely, the second terminal, for example, UE-A) receives data (the data includes the SCI) sent by the first terminal on the first transmission resource, whether a resource conflict occurs on the second transmission resource reserved by the first terminal may be determined. If a resource conflict occurs, the second terminal may determine, in a slot meeting a first interval time a based on the SCI on the first transmission resource, a transmission resource (namely, the target transmission resource) of the resource conflict indication channel associated with the second transmission resource, and feed back (that is, transmit) the resource conflict indication information in the target transmission resource. In this way, resource conflict can be effectively indicated, thereby improving data transmission reliability.

Optionally, the first interval time is a time interval starting from a first time at which transmission of the SCI on the first transmission resource ends and ending at a start time of a first resource of the closest resource conflict indication channel.

There is at least a minimum resource conflict detection processing time between the first time and the start time of the first resource.

Optionally, the first interval time is determined based on at least one of the following:

the minimum resource conflict detection processing time;

the time-frequency resource location of the first transmission resource; and configuration information of the resource conflict indication channel resource.

Optionally, the second interval time is a time interval starting from a second time at which the target transmission resource ends and ending at a start time of the second transmission resource.

There is at least a minimum transmission processing time between the second time and the start time of the second transmission resource.

Optionally, the second interval time is determined based on at least one of the following:

a minimum transmission processing time;

the time-frequency resource location of the second transmission resource; and configuration information of the resource conflict indication channel resource.

Optionally, the second determining module includes:

determine a candidate resource set of transmission resource used to transmit the resource conflict indication channel, where the candidate resource set includes a slot location and a PRB location in frequency domain that are corresponding to the transmission resource; and determine the target transmission resource based on the candidate resource set.

Optionally, the candidate resource set is determined based on at least one of the following:

the time-frequency resource location of the first transmission resource; and the time-frequency resource location of the second transmission resource.

Optionally, in a case in which the candidate resource set is determined based on the time-frequency resource occupied by the first transmission resource, a length of the second interval time is a minimum transmission processing time.

Optionally, in a case in which the candidate resource set is determined based on a time-frequency resource occupied by the second transmission resource, the candidate resource set is determined based on at least one of the following:

a minimum transmission processing time;

the time-frequency resource location of the second transmission resource; and configuration information of the resource conflict indication channel resource.

Optionally, the target transmission resource is determined based on at least one of the following:

a CRC bit in 1st-stage SCI, where the 1st-stage SCI is 1st-stage SCI of SCI in the first transmission resource;

source ID information in 2nd-stage SCI, where the 2nd-stage SCI is 2nd-stage SCI of SCI in the first transmission resource;

a quantity of PRBs in the candidate resource set; and a quantity of sequence pairs allowed to be orthogonally multiplexed in one PRB.

Optionally, a slot of the target transmission resource is associated with the first transmission resource, and the associated first transmission resource is in N continuous slots located before the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

Optionally, a slot of the target transmission resource is associated with the second transmission resource, and the associated second transmission resource is in N continuous slots located after the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

Optionally, the data that is transmitted further includes SCI used to indicate a time-frequency resource location of a third transmission resource. The third transmission resource is a resource reserved by the first terminal.

The first transmission resource, the second transmission resource, and the third transmission resource are arranged in chronological order.

Embodiment 4 of the present disclosure is corresponding to the method in Embodiment 2. All implementation means in Embodiment 2 are applicable to embodiments of the sidelink data transmission apparatus, and a same technical effect can be achieved.

Embodiment 5

Figures 17, 18:
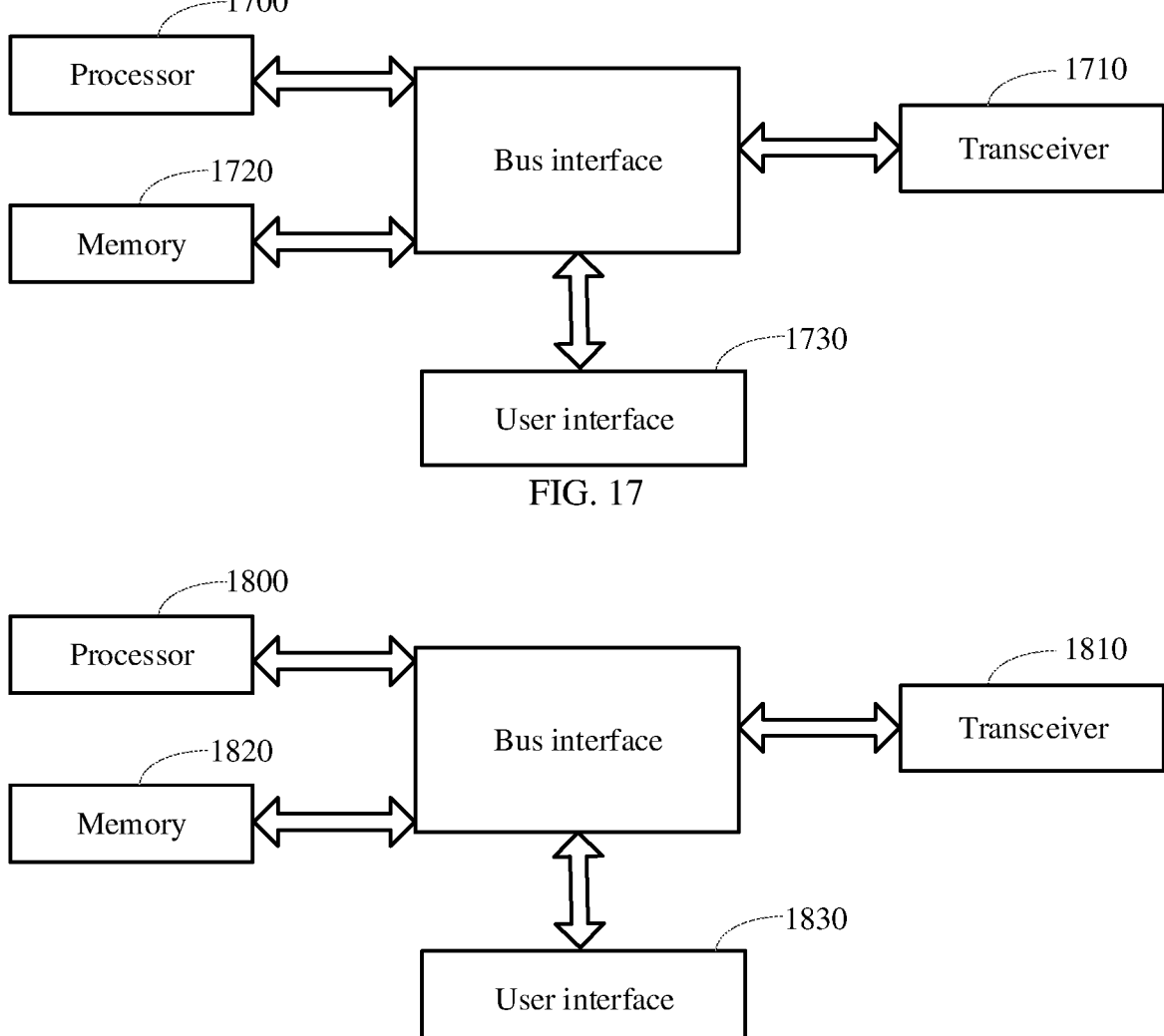
FIG. 17 is a structural block diagram of a terminal according to an embodiment of the present disclosure.
FIG. 18 is a structural block diagram of a terminal according to another embodiment of the present disclosure.

To better implement the foregoing objectives, as shown in FIG. 17, Embodiment 5 of the present disclosure further provides a terminal, where the terminal is a first terminal and includes:

a processor 1700; and a memory 1720 connected to the processor 1700 by using a bus interface. The memory 1720 is configured to store a program and data that are used when the processor 1700 operates, and the processor 1700 invokes and executes the program and data that are stored in the memory 1720.

A transceiver 1710 is connected to the bus interface, and is configured to receive and transmit data under control of the processor 1700. The processor 1700 is configured to read a program in the memory 1720 and perform following steps:

determining a time-frequency resource location of each of a first transmission resource and a second transmission resource for data transmission;

transmitting data on the first transmission resource, where the data that is transmitted includes at least sidelink control information SCI used to indicate the time-frequency resource location of the second transmission resource; and the second transmission resource is transmitted after the first transmission resource; and determining a target transmission resource of a resource conflict indication channel used to receive resource conflict indication information, where the resource conflict indication information is used to indicate that a resource conflict occurs on the second transmission resource.

There is at least a minimum interval time between the first transmission resource and the second transmission resource, and the minimum interval time includes a first interval time and a second interval time.

There is at least a first interval time between the first transmission resource and the target transmission resource, and there is at least a second interval time between the target transmission resource and the second transmission resource.

In FIG. 17, a bus architecture may include any quantity of interconnected buses and bridges, and specifically interconnect various circuits of one or more processors represented by the processor 1700 and a memory represented by the memory 1720. The bus architecture may further interconnect various other circuits such as a peripheral device, a voltage regulator, and a power management circuit. These are all well known in the art, and therefore are not further described in this specification. The bus interface provides an interface. The transceiver 1710 may be a plurality of components, including a transmitter and a transceiver, and provides units for communicating with a variety of other apparatuses on a transmission medium. For different terminals, a user interface 1730 may alternatively be an interface capable of externally or internally connecting a required device, and the connected device includes, but is not limited to, a keypad, a display, a speaker, a microphone, a joystick, and the like. The processor 1700 is responsible for management of the bus architecture and general processing, and the memory 1720 may store data for use by the processor 1700 when the processor 1700 operates.

Optionally, the first interval time is a time interval starting from a first time at which transmission of the SCI on the first transmission resource ends and ending at a start time of a first resource of the closest resource conflict indication channel.

There is at least a minimum resource conflict detection processing time between the first time and the start time of the first resource.

Optionally, the first interval time is determined based on at least one of the following:

the minimum resource conflict detection processing time;

the time-frequency resource location of the first transmission resource; and configuration information of the resource conflict indication channel resource.

Optionally, the second interval time is a time interval starting from a second time at which the target transmission resource ends and ending at a start time of the second transmission resource.

There is at least a minimum transmission processing time between the second time and the start time of the second transmission resource.

Optionally, the second interval time is determined based on at least one of the following:

a minimum transmission processing time;

the time-frequency resource location of the second transmission resource; and configuration information of the resource conflict indication channel resource.

Optionally, when the processor 1700 is configured to determine the target transmission resource of the resource conflict indication channel used to receive the resource conflict indication information, the processor 1700 is specifically configured to:

determine a candidate resource set of transmission resource used to receive the resource conflict indication channel, where the candidate resource set includes a slot location and a physical resource block PRB location in frequency domain that are corresponding to the transmission resource; and determine the target transmission resource based on the candidate resource set.

Optionally, the candidate resource set is determined based on at least one of the following:

the time-frequency resource location of the first transmission resource; and the time-frequency resource location of the second transmission resource.

Optionally, in a case in which the candidate resource set is determined based on the time-frequency resource occupied by the first transmission resource, a length of the second interval time is a minimum transmission processing time.

Optionally, in a case in which the candidate resource set is determined based on a time-frequency resource occupied by the second transmission resource, the candidate resource set is determined based on at least one of the following:

a minimum transmission processing time;

the time-frequency resource location of the second transmission resource; and configuration information of the resource conflict indication channel resource.

Optionally, the target transmission resource is determined based on at least one of the following:

a cyclic redundancy check CRC bit in first stage sidelink control information 1st-stage SCI, where the 1st-stage SCI is 1st-stage SCI of SCI in the first transmission resource;

source identity ID information in second stage sidelink control information 2nd-stage SCI, where the 2nd-stage SCI is 2nd-stage SCI of SCI in the first transmission resource;

a quantity of PRBs in the candidate resource set; and a quantity of sequence pairs allowed to be orthogonally multiplexed in one PRB.

Optionally, a slot of the target transmission resource is associated with the first transmission resource, and the associated first transmission resource is in N continuous slots located before the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

Optionally, a slot of the target transmission resource is associated with the second transmission resource, and the associated second transmission resource is in N continuous slots located after the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

Optionally, the data that is transmitted further includes SCI used to indicate a time-frequency resource location of a third transmission resource. The third transmission resource is a resource reserved by the first terminal.

The first transmission resource, the second transmission resource, and the third transmission resource are arranged in chronological order.

The first terminal provided in the present disclosure may determine a target transmission resource of the resource conflict indication channel associated with the second transmission resource. In this way, if resource conflict indication information is detected in the target transmission resource, resource reselection can be triggered for the second transmission resource.

Embodiment 6

To better implement the foregoing objectives, as shown in FIG. 18, Embodiment 6 of the present disclosure further provides a terminal, where the terminal is a second terminal and includes:

a processor 1800; and a memory 1820 connected to the processor 1800 by using a bus interface. The memory 1820 is configured to store a program and data that are used when the processor 1800 operates, and the processor 1800 invokes and executes the program and data that are stored in the memory 1820.

A transceiver 1810 is connected to the bus interface, and is configured to receive and transmit data under control of the processor 1800. The processor 1800 is configured to read a program in the memory 1820 and perform following steps:

receiving data transmitted by a first terminal on a first transmission resource, where the data that is transmitted includes at least SCI used to indicate a time-frequency resource location of a second transmission resource; and the second transmission resource is transmitted after the first transmission resource; and determining, based on the SCI, a target transmission resource of a resource conflict indication channel used to transmit resource conflict indication information, where the resource conflict indication information is used to indicate that a resource conflict occurs on the second transmission resource.

There is at least a first interval time between the first transmission resource and the target transmission resource, and there is at least a second interval time between the target transmission resource and the second transmission resource.

In FIG. 18, a bus architecture may include any quantity of interconnected buses and bridges, and specifically interconnect various circuits of one or more processors represented by the processor 1800 and a memory represented by the memory 1820. The bus architecture may further interconnect various other circuits such as a peripheral device, a voltage regulator, and a power management circuit. These are all well known in the art, and therefore are not further described in this specification. The bus interface provides an interface. The transceiver 1810 may be a plurality of components, including a transmitter and a transceiver, and provides units for communicating with a variety of other apparatuses on a transmission medium. For different terminals, a user interface 1830 may alternatively be an interface capable of externally or internally connecting a required device, and the connected device includes, but is not limited to, a keypad, a display, a speaker, a microphone, a joystick, and the like. The processor 1800 is responsible for management of the bus architecture and general processing, and the memory 1820 may store data for use by the processor 1800 when the processor 1800 operates.

Optionally, the first interval time is a time interval starting from a first time at which transmission of the SCI on the first transmission resource ends and ending at a start time of a first resource of the closest resource conflict indication channel.

There is at least a minimum resource conflict detection processing time between the first time and the start time of the first resource.

Optionally, the first interval time is determined based on at least one of the following:

the minimum resource conflict detection processing time;

the time-frequency resource location of the first transmission resource; and configuration information of the resource conflict indication channel resource.

Optionally, the second interval time is a time interval starting from a second time at which the target transmission resource ends and ending at a start time of the second transmission resource.

There is at least a minimum transmission processing time between the second time and the start time of the second transmission resource.

Optionally, the second interval time is determined based on at least one of the following:

a minimum transmission processing time;

the time-frequency resource location of the second transmission resource; and configuration information of the resource conflict indication channel resource.

Optionally, when the processor 1800 is configured to determine the target transmission resource of the resource conflict indication channel used to transmit the resource conflict indication information, the processor 1800 is specifically configured to:

determine a candidate resource set of transmission resource used to transmit the resource conflict indication channel, where the candidate resource set includes a slot location and a PRB location in frequency domain that are corresponding to the transmission resource; and determine the target transmission resource based on the candidate resource set.

Optionally, the candidate resource set is determined based on at least one of the following:

the time-frequency resource location of the first transmission resource; and the time-frequency resource location of the second transmission resource.

Optionally, in a case in which the candidate resource set is determined based on the time-frequency resource occupied by the first transmission resource, a length of the second interval time is a minimum transmission processing time.

Optionally, in a case in which the candidate resource set is determined based on a time-frequency resource occupied by the second transmission resource, the candidate resource set is determined based on at least one of the following:

a minimum transmission processing time;

the time-frequency resource location of the second transmission resource; and configuration information of the resource conflict indication channel resource.

Optionally, the target transmission resource is determined based on at least one of the following:

a CRC bit in 1st-stage SCI, where the 1st-stage SCI is 1st-stage SCI of SCI in the first transmission resource;

source ID information in 2nd-stage SCI, where the 2nd-stage SCI is 2nd-stage SCI of SCI in the first transmission resource;

a quantity of PRBs in the candidate resource set; and a quantity of sequence pairs allowed to be orthogonally multiplexed in one PRB.

Optionally, a slot of the target transmission resource is associated with the first transmission resource, and the associated first transmission resource is in N continuous slots located before the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

Optionally, a slot of the target transmission resource is associated with the second transmission resource, and the associated second transmission resource is in N continuous slots located after the slot of the target transmission resource and at least spaced apart from the slot of the target transmission resource by a minimum resource conflict detection processing time.

N is a period of a resource corresponding to a resource conflict indication channel configured for the resource pool, and N is a positive integer.

Optionally, the data that is transmitted further includes SCI used to indicate a time-frequency resource location of a third transmission resource. The third transmission resource is a resource reserved by the first terminal.

The first transmission resource, the second transmission resource, and the third transmission resource are arranged in chronological order.

The second terminal provided in the present disclosure may determine, after receiving the data sent by the first terminal on the first transmission resource, whether a resource conflict occurs on the second transmission resource reserved by the first terminal. If a resource conflict occurs, a transmission resource (namely, the target transmission resource) of the resource conflict indication channel associated with the second transmission resource may be determined based on the SCI on the first transmission resource, and the resource conflict indication information is fed back in the target transmission resource. In this way, resource conflict can be effectively indicated, thereby improving data transmission reliability.

A person skilled in the art may understand that all or some of the steps of the foregoing embodiments may be implemented by hardware, or may be implemented by a computer program indicating related hardware, and the computer program includes instructions for executing some or all of the steps of the foregoing methods. In addition, the computer program may be stored in a readable storage medium, and the storage medium may be any form of storage medium.

In addition, a specific embodiment of the present disclosure further provides a computer-readable storage medium, on which a computer program is stored. When the program is executed by a processor, steps of the method in Embodiment 1 are implemented, or steps of the method in Embodiment 2 are implemented. A same technical effect can be achieved. To avoid repetition, details are not described herein again.

In addition, it should be noted that, in the apparatus and method of the present disclosure, it is obvious that each component or step may be decomposed and/or recombined. The decomposition and/or the recombination shall be considered equivalent solutions to the present disclosure. In addition, the steps for performing the foregoing series of processing may be performed in a chronological order as described, but do not necessarily need to be performed in a chronological order, and some of the steps may be performed in parallel or independently of one another. A person of ordinary skill in the art can understand that all or any of the steps or components of the methods and apparatuses of the present disclosure may be implemented in any computing apparatus (including a processor, a storage medium, or the like) or a network of a computing apparatus by using hardware, firmware, software, or a combination thereof, which can be implemented by a person of ordinary skill in the art by using their basic programming skills when reading the description of the present disclosure.

Therefore, the objectives of the present disclosure may also be achieved by running a program or a group of programs on any computing apparatus. The computing apparatus may be a well-known general apparatus. Therefore, the objectives of the present disclosure may also be achieved by providing only a program product including program code for implementing the methods or apparatuses. In other words, such a program product is also included in the present disclosure, and a storage medium that stores such a program product is also included in the present disclosure. Obviously, the storage medium may be any well-known storage medium or any storage medium developed in the future. It should also be noted that in the apparatuses and methods of the present disclosure, it is obvious that each component or step may be decomposed and/or recombined. The decomposition and/or the recombination shall be con- sidered equivalent solutions to the present disclosure. In addition, the steps for performing the foregoing series of processing may be performed in a chronological order as described, but do not necessarily need to be performed in a chronological order. Some of the steps may be performed in parallel or independently of one another.

It should be noted that the foregoing module division is merely a logical function division. In actual implementation, all or some of the modules may be integrated into one physical entity, or may be physically separated. In addition, these modules may be implemented in a form of software invoked by a processing element; or may be all implemented in a form of hardware; or some modules may be imple- mented in a form of software invoked by a processing element, and some modules may be implemented in a form of hardware. For example, a determining module may be a separately disposed processing element, or may be inte- grated into a chip of the foregoing apparatus for implemen- tation. In addition, the determining module may be stored in a memory of the foregoing apparatus in a form of program code, and a processing element of the foregoing apparatus invokes the program code and executes a function of the determining module. An implementation of another module is similar. In addition, all or some of the modules may be integrated together, or may be independently implemented. The processing element herein may be an integrated circuit having a signal processing capability. In an implementation process, the steps in the foregoing methods or the foregoing modules may be completed by an integrated logic circuit of hardware in the processor element or instructions in a form of software.

For example, modules, units, subunits, or submodules may be configured to implement one or more integrated circuits in the foregoing methods, for example, one or more application specific integrated circuits (ASIC), or one or more digital signal processors (DSP), or one or more field programmable gate arrays (FPGA), or the like. For another example, when a module is implemented in the form of program code being scheduled by a processing element, the processing element may be a general-purpose processor, for example, a central processing unit (CPU) or another pro- cessor capable of invoking the program code. For another example, these modules may be integrated together and implemented in a form of a system-on-a-chip (SOC).

The terms "first", "second" and the like in this specifica- tion and claims of the present disclosure are used to distin- guish between similar objects, rather than to describe a particular order or a sequential order. It should be under- stood that the data used in this way may be interchangeable under appropriate circumstances such that embodiments of the present disclosure described herein are implemented, for example, in an order different from that illustrated or described herein. In addition, the terms "include" and "have" and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such process, method, prod- uct, or device. In addition, in the specification and claims, "and/or" is used to indicate at least one of connected objects. For example, A and/or B and/or C represents the following seven cases: Only A is included, only B is included, only C is included, both A and B exist, both B and C exist, both A and C exist, and A, B and C all exist. Similarly, "at least one of A and B" used in this specification and claims should be understood as "only A is included, only B is included, or both A and B exist".

The foregoing descriptions are merely the preferred implementations of the present disclosure. It should only be noted that those of ordinary skill in the art may further make various improvements and modifications without departing from the principles of the present disclosure, and these improvements and modifications also fall within the protec- tion scope of the present disclosure.

What is claimed is:

1. A sidelink data transmission method, applied to a first terminal, comprising:
   determining time-frequency resource locations of a first transmission resource, a second transmission resource and a third transmission resource for data transmission;
   transmitting data on the first transmission resource in a single transmission, wherein the data that is transmitted in the single transmission comprises at least sidelink control information (SCI) used to indicate the time- frequency resource location of the second transmission resource together with a time-frequency resource loca- tion of the third transmission resource, wherein the first transmission resource is earlier than the second trans- mission resource, and the second transmission resource is earlier than the third transmission resource; and
   determining a target transmission resource of a resource conflict indication channel used to receive resource conflict indication information, wherein the resource conflict indication information is used to indicate only that a resource conflict occurs on the second transmis- sion resource,
   wherein there is at least a minimum interval time between the first transmission resource and the second transmis- sion resource, and the minimum interval time com- prises a first interval time and a second interval time; and
   there is at least the first interval time between the first transmission resource and the target transmission resource, and there is at least the second interval time between the target transmission resource and the sec- ond transmission resource,
   the first interval time is a time interval starting from a first time at which transmission of the SCI on the first transmission resource ends and ending at a start time of a first resource of the closest resource conflict indica- tion channel; and
   there is at least a minimum resource conflict detection processing time between the first time and the start time of the first resource.

2. The sidelink data transmission method according to claim 1, wherein the second transmission resource is a next transmission resource following the first transmission resource.

3. The sidelink data transmission method according to claim 1, wherein the second interval time is a time interval starting from a second time at which the target transmission resource ends and ending at a start time of the second transmission resource; and there is at least a minimum transmission processing time between the second time and the start time of the second transmission resource.

4. The sidelink data transmission method according to claim 1, wherein the determining a target transmission resource of a resource conflict indication channel used to receive resource conflict indication information comprises:

determining a candidate resource set of transmission resource used to receive the resource conflict indication channel, wherein the candidate resource set comprises a slot location and a physical resource block (PRB) location in frequency domain that are corresponding to the transmission resource; and determining the target transmission resource based on the candidate resource set.

5. The sidelink data transmission method according to claim 4, wherein the candidate resource set is determined based on at least one of the following:

the time-frequency resource location of the first transmission resource; and the time-frequency resource location of the second transmission resource.

6. The sidelink data transmission method according to claim 4, wherein the target transmission resource is determined based on at least one of the following:

a cyclic redundancy check (CRC) bit in first stage sidelink control information (1st-stage SCI), wherein the 1st-stage SCI is 1st-stage SCI of SCI in the first transmission resource;

source identity (ID) information in second stage sidelink control information (2nd-stage SCI), wherein the 2nd-stage SCI is 2nd-stage SCI of SCI in the first transmission resource;

a quantity of PRBs in the candidate resource set; and a quantity of sequence pairs allowed to be orthogonally multiplexed in one PRB.

7. The sidelink data transmission method according to claim 1, wherein a slot of the target transmission resource is associated with the first transmission resource, and the associated first transmission resource is in N continuous slots located before the slot of the target transmission resource and at least spaced apart from the slot of the target transmission resource by a minimum resource conflict detection processing time, or a slot of the target transmission resource is associated with the second transmission resource, and the associated second transmission resource is in N continuous slots located after the slot of the target transmission resource and at least spaced apart from the slot of the target transmission resource by a minimum resource conflict detection processing time;

wherein N is a period of a resource corresponding to a resource conflict indication channel configured for a resource pool, and N is a positive integer.

8. A sidelink data transmission method, applied to a second terminal, comprising:

receiving data transmitted by a first terminal on a first transmission resource in a single transmission, wherein the data that is transmitted in the single transmission comprises at least SCI used to indicate a time-frequency resource location of a second transmission resource together with a time-frequency resource location of a third transmission resource, wherein the first transmission resource is earlier than the second transmission resource, and the second transmission resource is earlier than the third transmission resource; and determining, based on the SCI, a target transmission resource of a resource conflict indication channel used to transmit resource conflict indication information, wherein the resource conflict indication information is used to indicate only that a resource conflict occurs on the second transmission resource, wherein there is at least a first interval time between the first transmission resource and the target transmission resource, and there is at least a second interval time between the target transmission resource and the second transmission resource, the first interval time is a time interval starting from a first time at which transmission of the SCI on the first transmission resource ends and ending at a start time of a first resource of the closest resource conflict indication channel; and there is at least a minimum resource conflict detection processing time between the first time and the start time of the first resource.

9. The sidelink data transmission method according to claim 8, wherein the second transmission resource is a next transmission resource following the first transmission resource.

10. The sidelink data transmission method according to claim 8, wherein the second interval time is a time interval starting from a second time at which the target transmission resource ends and ending at a start time of the second transmission resource; and there is at least a minimum transmission processing time between the second time and the start time of the second transmission resource.

11. The sidelink data transmission method according to claim 8, wherein the determining a target transmission resource of a resource conflict indication channel used to transmit resource conflict indication information comprises:

determining a candidate resource set of transmission resource used to transmit the resource conflict indication channel, wherein the candidate resource set comprises a slot location and a PRB location in frequency domain that are corresponding to the transmission resource; and determining the target transmission resource based on the candidate resource set.

12. The sidelink data transmission method according to claim 11, wherein the candidate resource set is determined based on at least one of the following:

a time-frequency resource location of the first transmission resource; and the time-frequency resource location of the second transmission resource.

13. The sidelink data transmission method according to claim 11, wherein the target transmission resource is determined based on at least one of the following:

a CRC bit in 1st-stage SCI, wherein the 1st-stage SCI is 1st-stage SCI of SCI in the first transmission resource;

source ID information in 2nd-stage SCI, wherein the 2nd-stage SCI is 2nd-stage SCI of SCI in the first transmission resource;

a quantity of PRBs in the candidate resource set; and a quantity of sequence pairs allowed to be orthogonally multiplexed in one PRB.

14. The sidelink data transmission method according to claim 8, wherein a slot of the target transmission resource is associated with the first transmission resource, and the associated first transmission resource is in N continuous slots located before the slot of the target transmission resource and at least spaced apart from the slot of the target transmission resource by a minimum resource conflict detection processing time, or a slot of the target transmission resource is associated with the second transmission resource, and the associated second transmission resource is in N continuous slots located after the slot of the target transmission resource and at least spaced apart from the slot of the target transmission resource by a minimum resource conflict detection processing time, wherein N is a period of a resource corresponding to a resource conflict indication channel configured for a resource pool, and N is a positive integer.

15. A terminal, comprising a transceiver, a memory, a processor, and a computer program stored in the memory and running on the processor, wherein when the processor executes the computer program, steps of the sidelink data transmission method according to claim 1 are implemented.

16. A terminal, comprising a transceiver, a memory, a processor, and a computer program stored in the memory and running on the processor, wherein when the processor executes the computer program, steps of the sidelink data transmission method according to claim 10 are implemented.

\*   \*   \*   \*   \*